United States Patent
Morizane et al.

(10) Patent No.: US 12,547,171 B2
(45) Date of Patent: Feb. 10, 2026

(54) TRAFFIC CONTROL SERVER, TRAFFIC CONTROL SYSTEM, AND DISPLAY DEVICE CAPABLE OF WIRELESS COMMUNICATION WITH TRAFFIC CONTROL SERVER

(71) Applicant: Hitachi Construction Machinery Co., Ltd., Tokyo (JP)

(72) Inventors: Hiroto Morizane, Tokyo (JP); Tomoyuki Hamada, Tsuchiura (JP); Mikio Bando, Tokyo (JP); Masaki Kanai, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 493 days.

(21) Appl. No.: 17/913,968

(22) PCT Filed: Mar. 12, 2021

(86) PCT No.: PCT/JP2021/009949
§ 371 (c)(1),
(2) Date: Sep. 23, 2022

(87) PCT Pub. No.: WO2021/200025
PCT Pub. Date: Oct. 7, 2021

(65) Prior Publication Data
US 2023/0123961 A1 Apr. 20, 2023

(30) Foreign Application Priority Data
Mar. 31, 2020 (JP) .................................. 2020-061867

(51) Int. Cl.
*G05D 1/00* (2006.01)
*G08G 1/00* (2006.01)
*G08G 1/16* (2006.01)

(52) U.S. Cl.
CPC ............. *G05D 1/0027* (2013.01); *G08G 1/16* (2013.01); *G08G 1/22* (2013.01)

(58) Field of Classification Search
CPC .......... G05D 1/0027; G08G 1/16; G08G 1/22; G08G 1/015; G08G 1/164; G08G 1/207; G06Q 10/063; G06Q 10/08; G06Q 50/02
See application file for complete search history.

(56) References Cited

U.S. PATENT DOCUMENTS

2016/0217690 A1   7/2016  Yamasaki et al.
2017/0061796 A1   3/2017  Osagawa
(Continued)

FOREIGN PATENT DOCUMENTS

JP    2015-191341 A    11/2015
JP    2016-218576 A    12/2016
(Continued)

OTHER PUBLICATIONS

International Search Report (PCT/ISA/210) issued in PCT Application No. PCT/JP2021/009949 dated Apr. 6, 2021 with English translation (four (4) pages).
(Continued)

*Primary Examiner* — Ramya P Burgess
(74) *Attorney, Agent, or Firm* — Crowell & Moring LLP

(57) ABSTRACT

Provided is a traffic control server, a traffic control system, and a display device capable of wirelessly communicating with the traffic control server that are capable of realizing both safety securement for a manned vehicle and an unmanned vehicle traveling in a mine and prevention of reduction in productivity by controlling interference between the manned vehicle and the unmanned vehicle. An interference control part of the traffic control server generates warning information for performing at least one of displaying a warning screen or making a warning sound to (Continued)

the manned vehicle in accordance with an overlap (interference) among a stop trigger region of the manned vehicle, a travel-permitted section set for the unmanned vehicle, a next travel-permitted section that is the travel-permitted section to be subsequently set for the unmanned vehicle, and a warning region set for the travel-permitted section, and a server-side communication control part transmits the warning information to the manned vehicle.

8 Claims, 26 Drawing Sheets

(56) References Cited

U.S. PATENT DOCUMENTS

| 2018/0182248 A1* | 6/2018 | Kanai | G08G 1/207 |
| 2019/0206254 A1* | 7/2019 | Tao | B60W 30/0956 |

FOREIGN PATENT DOCUMENTS

| JP | 6325655 B2 | 5/2018 |
| WO | WO 2015/151291 A1 | 10/2015 |
| WO | WO 2016/013687 A1 | 1/2016 |

OTHER PUBLICATIONS

Japanese-language Written Opinion (PCT/ISA/237) issued in PCT Application No. PCT/JP2021/009949 dated Apr. 6, 2021 (three (3) pages).

\* cited by examiner

Fig. 10
(a)
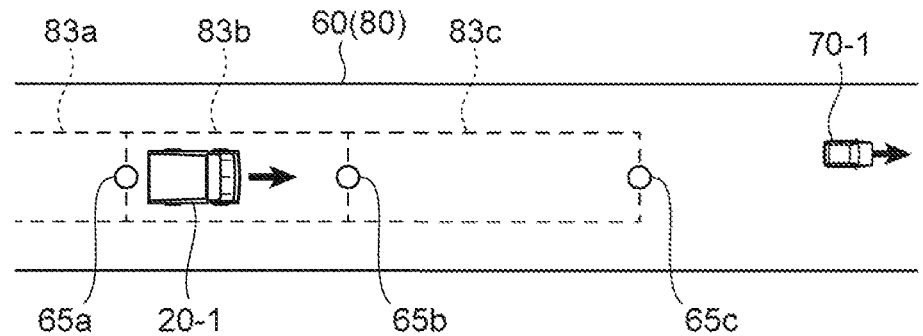
(b)
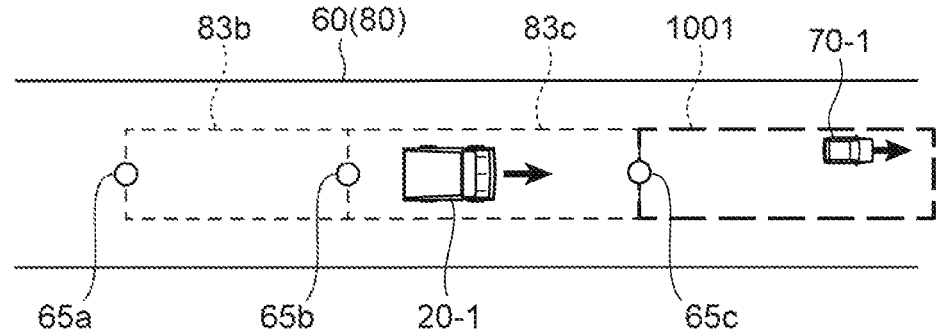
(c)
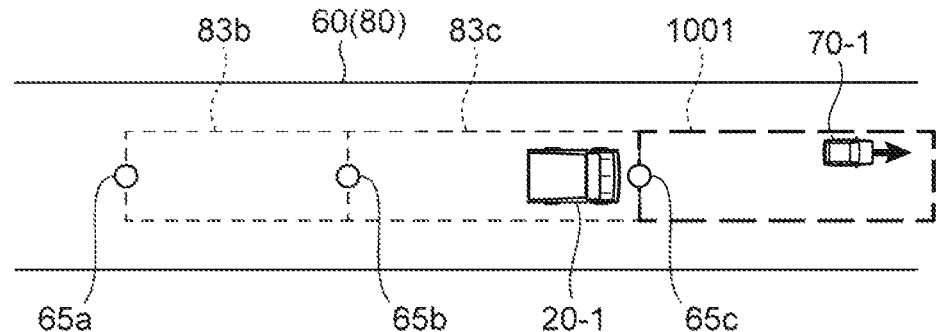

Fig. 12
(a)
Relations among travel-permitted section, warning region, and next travel-permitted section of unmanned dump truck
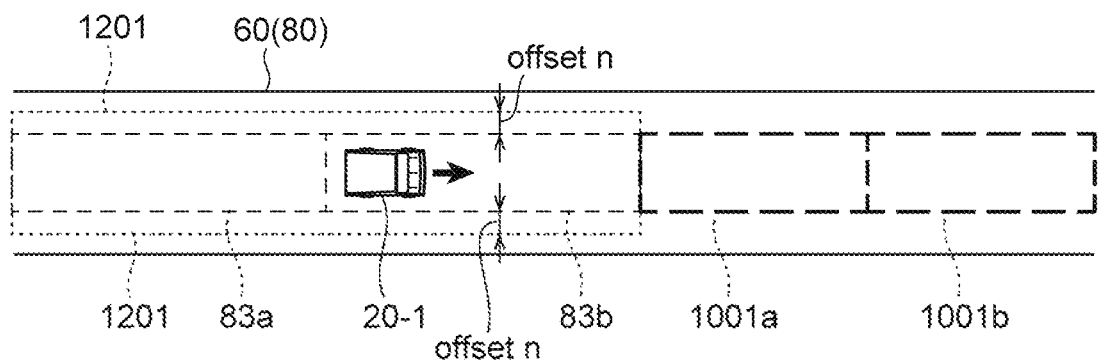
(b)
Setting of stop trigger region for manned vehicle
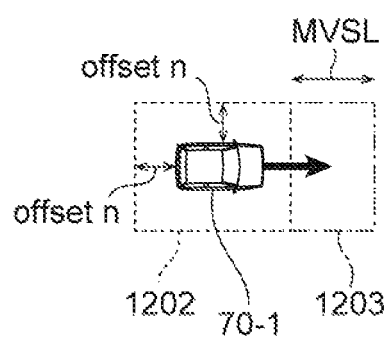

Fig. 15
(a) Upper side directed to the north
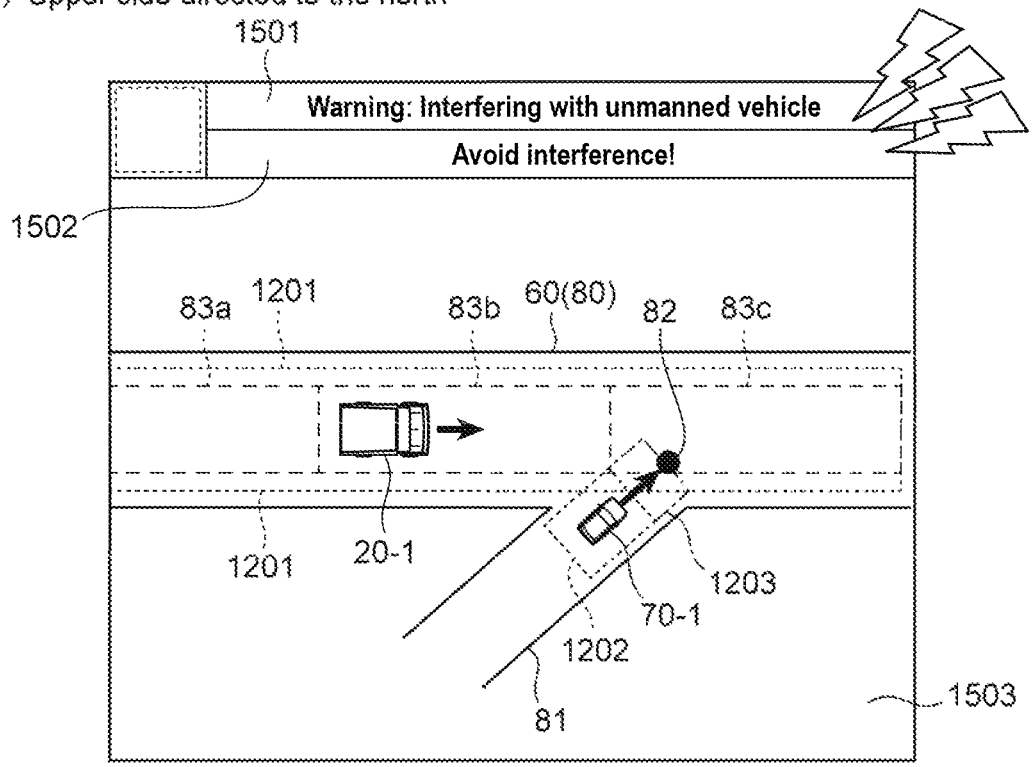
(b) Upper side directed in advancing direction of manned vehicle
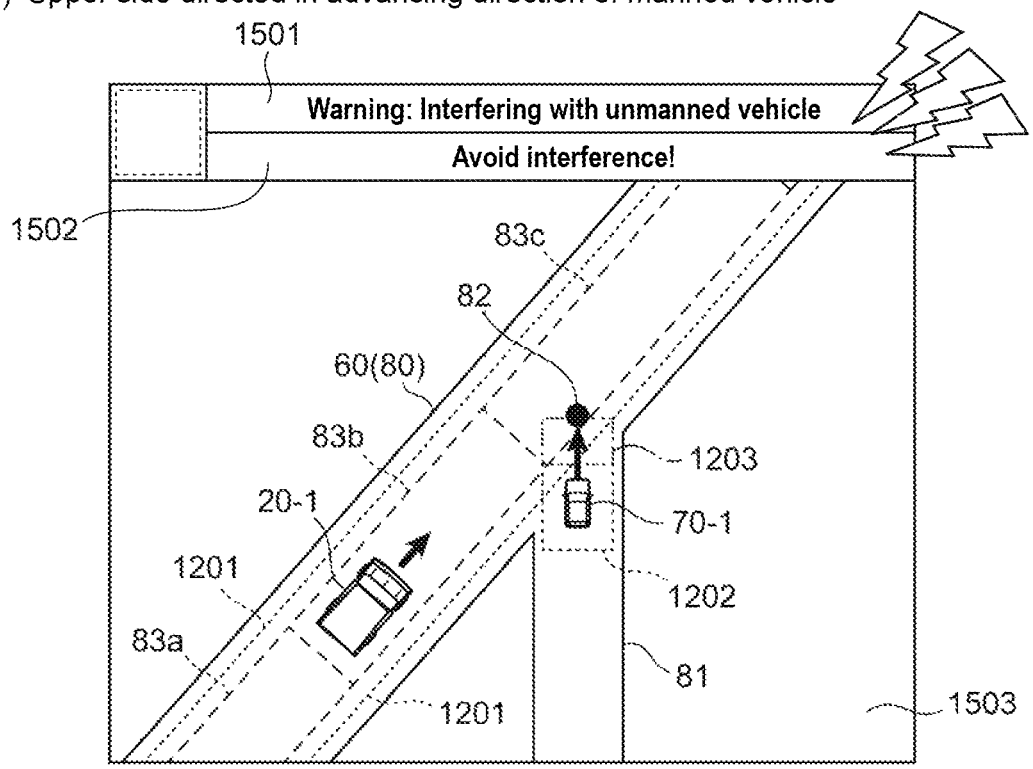

Fig. 16
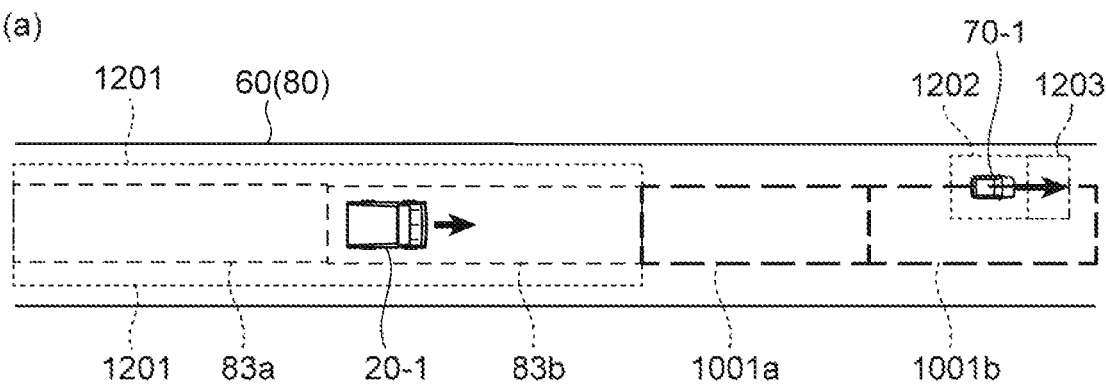
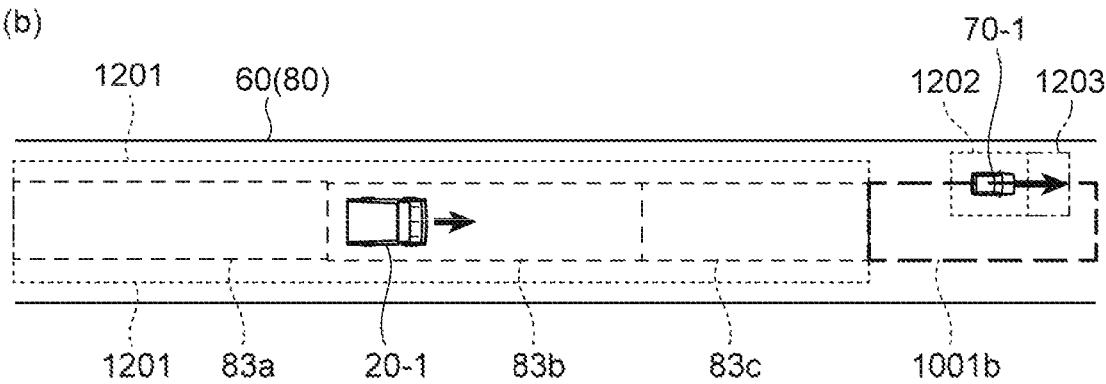

Fig. 22
(a) 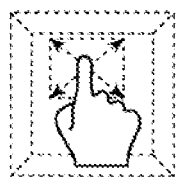   (b) 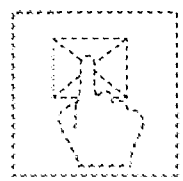   (c) 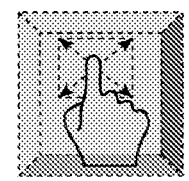

TRAFFIC CONTROL SERVER, TRAFFIC CONTROL SYSTEM, AND DISPLAY DEVICE CAPABLE OF WIRELESS COMMUNICATION WITH TRAFFIC CONTROL SERVER

TECHNICAL FIELD

The present invention relates to a traffic control server, a traffic control system, and a display device capable of wirelessly communicating with the traffic control server and in particular, a technique of suppressing interference between an unmanned vehicle and a manned vehicle traveling on a work site.

BACKGROUND ART

In open-pit mines or the like, a plurality of autonomously traveling vehicles (hereinafter referred to as "unmanned vehicles") such as unmanned dump trucks to haul excavated ores, bulldozers and graders for performing road maintenance work, water carts to prevent dust from floating, and manned vehicles such as patrolling service cars occasionally travel in a mixed manner. Since the unmanned vehicles autonomously travel in accordance with the instructions from a control station, the interference between the unmanned vehicles can be suppressed by the control station performing the traffic control. Meanwhile, since the manned vehicles travel in accordance with the decision by the drivers who drive the manned vehicles, the control station does not recognize how the manned vehicles advance. Therefore, in the current situation, the avoidance of interference between unmanned vehicles and manned vehicles significantly relies on the attention and driving skill of the drivers of the manned vehicles, and there is a demand for further improved safety.

As a technique for such avoidance of interference, Patent Literature 1 discloses a configuration in which one of a plurality of operation levels for avoiding interference is determined on the basis of the distance to the position where an unmanned vehicle and a manned vehicle intersect with each other, and warning information is output to the driver of the manned vehicle.

CITATION LIST

Patent Literature

Patent Literature 1: JP 6325655 B2

SUMMARY OF INVENTION

Technical Problem

Even in a case where a manned vehicle and an unmanned vehicle currently do not intersect in the advancing directions and do not contact with each other, a future risk of interference with the unmanned vehicle could emerge due to the operation by the driver of the manned vehicle, such as suddenly moving the manned vehicle and changing the direction, without noticing the unmanned vehicle approaching. In this case, the possibility of interference risk increases, thereby failing to sufficiently secure the safety.

Further, in a case where the current position of the manned vehicle is within the next travel-permitted section to be subsequently set for the unmanned vehicle, if attention of the manned vehicle is not called, a situation could occur in which the setting of the travel-permitted section for the unmanned vehicle is obstructed. Such a case causes the unmanned vehicle to stop, resulting in lowering the overall productivity in the mine.

Patent Literature 1 provides the technique useful for avoiding interference in a situation in which a manned vehicle and an unmanned vehicle intersect with each other in the advancing directions, but does not consider suppressing lowering of the overall productivity in the mine due to the interference risk increased without calling the attention of the driver of the manned vehicle and the interruption of the advancement of the unmanned vehicle by the manned vehicle, even in a situation in which the manned vehicle and the unmanned vehicle currently do not intersect with each other.

The present invention has been made to solve the aforementioned problem and provides a traffic control server, a traffic control system, and a display device capable of wirelessly communicating with the traffic control server that are capable of realizing both safety securement for a manned vehicle and an unmanned vehicle traveling in a mine and prevention of reduction in the productivity by controlling the interference between the manned vehicle and the unmanned vehicle.

Solution to Problem

To solve the aforementioned problem, the traffic control server according to the present invention is a traffic control server performing traffic control for interference control of an unmanned vehicle autonomously traveling along a predetermined travel path in a mine and a manned vehicle with a driver on board traveling in the mine, the traffic control server wirelessly communicating with and connected to each of the unmanned vehicle and the manned vehicle, and the traffic control server includes: a travel-permitted section setting part adapted to set a partial section on the travel path for the unmanned vehicle as a travel-permitted section where the unmanned vehicle is permitted to travel; an interference control part adapted to issue a warning to the manned vehicle to avoid interference between the manned vehicle and the unmanned vehicle traveling in the travel-permitted section, when the manned vehicle approaches the travel-permitted section; a master map information memory adapted to store map information indicating the travel path of the unmanned vehicle; a server-side communication control part adapted to transmit, to the unmanned vehicle, section response information indicating the travel-permitted section set, and transmit, to the manned vehicle, warning information for issuing the warning and adapted to receive position information of the manned vehicle calculated by a position calculation device mounted in the manned vehicle and position information of the unmanned vehicle calculated by a position calculation device of the unmanned vehicle; and an interference determination region setting part adapted to set a stop trigger region around the manned vehicle where the manned vehicle can stop, on the basis of the position information of the manned vehicle received, and adapted to set a warning region around the travel-permitted section set for the unmanned vehicle, in which the interference control part generates the warning information for performing at least one of displaying a warning screen or making a warning sound to the manned vehicle in accordance with an overlap among the stop trigger region of the manned vehicle, the travel-permitted section set for the unmanned vehicle, a next travel-permitted section that is the travel-permitted section to be subsequently set for the unmanned vehicle, and the warning region set for the travel-permitted section, and the server-side communication control part transmits the warning information to the manned vehicle.

Further, the traffic control system according to the present invention is a traffic control system including a traffic control server performing traffic control for interference avoidance of an unmanned vehicle autonomously traveling along a predetermined travel path in a mine and a manned vehicle with a driver on board traveling in the mine, the traffic control server wirelessly communicating with and connected to each of the unmanned vehicle and the manned vehicle, and the traffic control server includes: a travel-permitted section setting part adapted to set a partial section on the travel path for the unmanned vehicle as a travel-permitted section where the unmanned vehicle is permitted to travel; an interference control part adapted to issue a warning to the manned vehicle to avoid interference between the manned vehicle and the unmanned vehicle traveling in the travel-permitted section, when the manned vehicle approaches the travel-permitted section; a master map information memory adapted to store map information indicating the travel path of the unmanned vehicle; a server-side communication control part adapted to transmit, to the unmanned vehicle, section response information indicating the travel-permitted section set, and transmit, to the manned vehicle, warning information for issuing the warning and adapted to receive position information of the manned vehicle calculated by a position calculation device mounted in the manned vehicle and position information of the unmanned vehicle calculated by a position calculation device of the unmanned vehicle; and an interference determination region setting part adapted to set a stop trigger region around the manned vehicle where the manned vehicle can stop, on the basis of the position information of the manned vehicle received, and adapted to set a warning region around the travel-permitted section set for the unmanned vehicle, in which the manned vehicle includes a manned terminal-side communication control part adapted to receive the warning information and to transmit, to the traffic control server, the position information of the manned vehicle calculated by the position calculation device mounted in the manned vehicle, and a warning processing part adapted to perform processing of issuing the warning to the driver on the basis of the warning information; the unmanned vehicle includes an unmanned terminal-side communication control part adapted to receive the section response information and to transmit, to the traffic control server, the position information of the unmanned vehicle calculated by the position calculation device mounted in the unmanned vehicle, and an autonomous travel control part adapted to control the unmanned vehicle to autonomously travel on the basis of the section response information; the interference control part generates the warning information for performing at least one of displaying a warning screen or making a warning sound to the manned vehicle in accordance with an overlap among the stop trigger region of the manned vehicle, the travel-permitted section set for the unmanned vehicle, a next travel-permitted section that is the travel-permitted section to be subsequently set for the unmanned vehicle, and the warning region set for the travel-permitted section; and the server-side communication control part transmits the warning information to the manned vehicle.

Further, the display device according to the present invention is a display device wirelessly communicating with and connected to the traffic control server, the display device adapted to display the warning information, in which a screen display of the display device is changed on the basis of the warning information generated in accordance with an overlap among the stop trigger region of the manned vehicle, the travel-permitted section set for the unmanned vehicle, the next travel-permitted section that is the travel-permitted section to be subsequently set for the unmanned vehicle, and the warning region set for the travel-permitted section.

Advantageous Effects of Invention

According to the present invention, a user is urged to take avoidance action so as to enable to prioritize the advancement of an unmanned vehicle, and the safety can be secured by interference avoidance and the productivity can be improved as well.

It should be noted that other problems, configurations, and advantageous effects will become apparent from the following description of embodiments.

BRIEF DESCRIPTION OF DRAWINGS

FIG. 7A shows a travel-permitted section set for each unmanned dump truck; FIG. 7B shows a travel-permitted section newly set for the unmanned dump truck; and FIG. 7C shows a segment to be cancelled;

FIG. 9A shows a state in which the manned vehicle is at a stop; FIG. 9B shows a state of the manned vehicle traveling in a direction in which it does not intrude into the travel-permitted section of the unmanned dump truck; FIG. 9C shows a state of the unmanned dump truck passing the side of the manned vehicle; and FIG. 9D shows a state of the manned vehicle intruding into the travel-permitted section of the unmanned dump truck;

FIG. 10 shows states of the manned vehicle interrupting the advancement of the unmanned dump truck due to its presence in a next travel-permitted section candidate to be set for the unmanned dump truck: FIG. 10A shows a state of the unmanned dump truck advancing; FIG. 10B shows a state of the manned vehicle present in the next travel-permitted section candidate to be set for the unmanned dump truck; and FIG. 10C shows a state in which the unmanned dump truck stops at a terminal end of the set travel-permitted section:

FIG. 12 shows views for explaining regions for use in interference control processing: FIG. 12A shows relations among a travel-permitted section, a warning region, and a next travel-permitted section of the unmanned dump truck; and FIG. 12B shows setting of a stop trigger region for the manned vehicle;

FIG. 15 shows examples of screen display of a warning level 3: FIG. 15A is an example with the upper side directed to the north; and FIG. 15B is an example with the upper side directed in the advancing direction of the manned vehicle:

FIG. 16 shows states of the manned vehicle interrupting the advancement of the unmanned dump truck: FIG. 16A shows a state of the manned vehicle present in a travel-permitted section candidate that is the one ahead; and FIG. 16B shows a state in which a travel-permitted section candidate that is the one behind is set as the travel-permitted section;

FIG. 22 shows examples of screen display of a warning canceling button: FIG. 22A shows a state in which the warning canceling button is enabled; FIG. 22B shows a state in which the warning canceling button is disabled; and FIG. 22C shows a state in which the warning canceling button is pressed;

DESCRIPTION OF EMBODIMENTS

Figure 1:
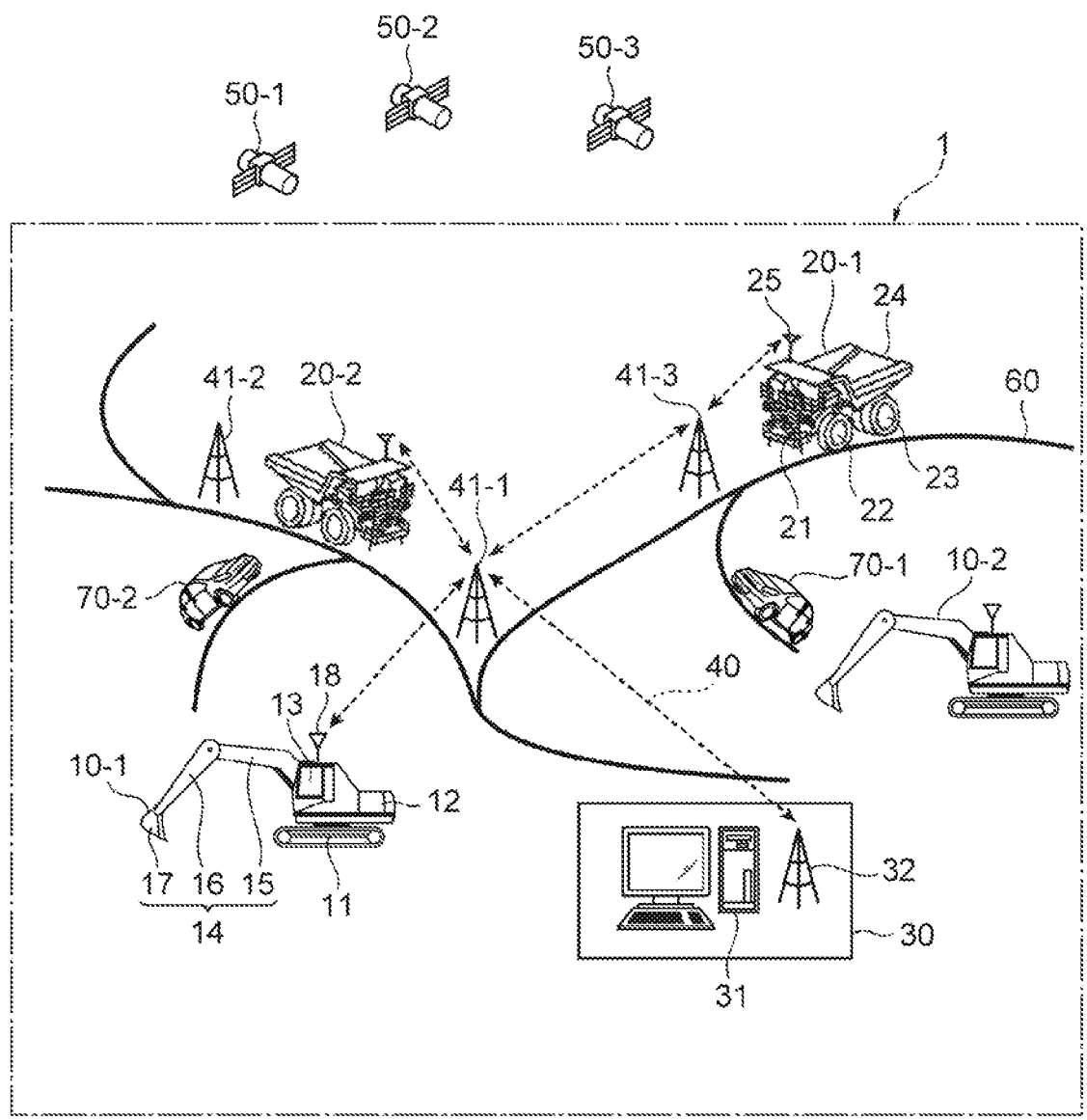
FIG. 1 is a view showing a schematic configuration of a traffic control system according to a first embodiment.

Hereinafter, embodiments of the present invention will be described with reference to the drawings. It should be noted that portions having the same function are denoted by the same or associated reference numerals throughout the drawings for description of the embodiments, and repeated descriptions thereof will be omitted. Further, in the following embodiments, the descriptions of the same or similar portions will not be repeated in principle unless otherwise particularly needed.

First Embodiment

A first embodiment relates to a traffic control system in which an unmanned dump truck (corresponding to an unmanned vehicle) autonomously traveling without a driver on board that hauls earth and sand or ores loaded by a loader, such as an excavator and a wheel loader, and a manned vehicle traveling with a driver on board, such as a bulldozer, a grader, a water cart, and a service car, in a mine are connected, via a wireless communication network, to a traffic control server that performs traffic control to avoid interference between these unmanned dump truck and manned vehicle, and is particularly characterized by the configuration for suppressing the interference between the unmanned dump truck and the manned vehicle while maintaining both productivity and safety. The traffic control system according to the first embodiment of the present invention will be described below with reference to the drawings.

First, referring to FIG. 1, the schematic configuration of the traffic control system according to the first embodiment will be described. FIG. 1 is a view showing the schematic configuration of the traffic control system according to the first embodiment. A traffic control system 1 shown in FIG. 1 is configured such that unmanned dump trucks (hereinafter referred to as "unmanned vehicles" in some cases) 20-1 and 20-2 for mining that haul payloads, such as earth and sand or ores, loaded by excavators 10-1 and 10-2 for loading the earth and sand or ores in a quarry, such as a mine, and manned vehicles 70-1 and 70-2, such as a water cart and a service car, each communicate with and are connected to a traffic control server 31 disposed in a control center 30 near or remote from the quarry, via a wireless communication network 40.

The unmanned dump trucks 20-1 and 20-2 each travel back and forth between a site of the excavator 10-1 or 10-2 and a dumping site (not shown) along a predetermined haul path 60 in the mine and haul payloads.

A plurality of wireless base stations 41-1, 41-2, and 41-3 is installed in the mine. Radio waves for wireless communication are transmitted and received via these wireless base stations 41-1, 41-2, and 41-3.

The excavators 10-1 and 10-2 and individual unmanned dump trucks 20-1 and 20-2 are provided with a position calculation device (illustration omitted in FIG. 1), which receives positioning radio waves from at least three positioning satellites 50-1, 50-2, and 50-3 of a global navigation satellite system (GNSS: Global Navigation System) to acquire the position of the own vehicle. Examples of the GNSS used may include the GPS (Global Positioning System) and the GALILEO. A plurality of unmanned dump trucks 20-1 and 20-2 and a plurality of manned vehicles 70-1 and 70-2 are actually present and individually wirelessly communicate with the traffic control server 31. Their configurations are the same and thus, the excavator 10-1, the unmanned dump truck 20-1, and the manned vehicle 70-1 will be described below as examples.

The excavator 10-1 is a super-sized hydraulic excavator and includes a traveling body 11, a turning body 12 provided on the traveling body 11 so as to be able to turn, an operator's cab 13, and a front work machine 14 provided in the front center of the turning body 12. The front work machine 14 includes a boom 15 provided movably upward and downward relative to the turning body 12, an arm 16 pivotably provided at a tip end of the boom 15, and a bucket 17 attached to a tip end of the arm 16. An antenna 18 for connection with the wireless communication network 40 is disposed in a location of good visibility of the excavator 10-1, for example, an upper portion of the operator's cab 13.

The unmanned dump truck 20-1 includes a frame 21 forming a main body, front wheels 22 and rear wheels 23, and a pair of left and right hoist cylinders (not shown) for pivoting, in an up-and-down direction, a loading platform 24 pivotable in the up-and-down direction about hinge pins (not shown) provided in a rear portion of the frame 21. Further, the unmanned dump truck 20-1 has an antenna 25 for connection with the wireless communication network 40 disposed at a location of good visibility, for example, in a front portion on the upper surface of the unmanned dump truck 20-1.

In addition, the unmanned dump truck 20-1 has mounted therein an on-board terminal device (hereinafter abbreviated as a "dump truck terminal device") 26 (see FIG. 3) for autonomously traveling in accordance with the instructions from the traffic control server 31.

The manned vehicle 70-1 has mounted therein an on-board terminal device (hereinafter abbreviated as a "manned vehicle terminal device") 76 (see FIG. 4) including a warning device 768 for issuing a warning to urge a driver to perform braking operation in accordance with the instructions from the traffic control server 31.

The traffic control server 31 is connected to an antenna 32 for connection with the wireless communication network 40. The traffic control server 31 communicates with each of the dump truck terminal device 26 and the manned vehicle terminal device 76 via the antenna 32 and the wireless base stations 41-1, 41-2, and 41-3.

Figure 2:
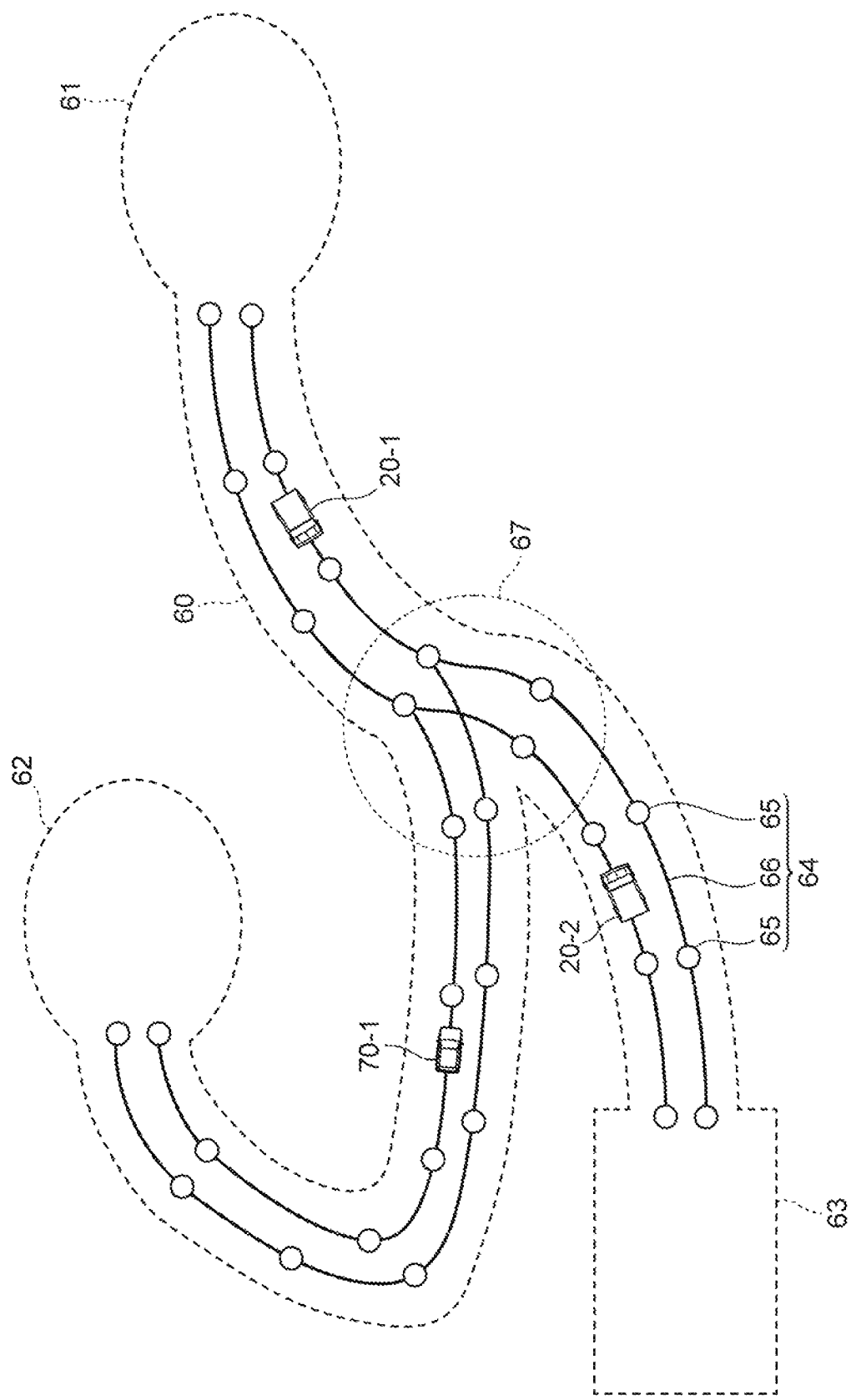
FIG. 2 is a view detailing a haul path of FIG. 1.

FIG. 2 is a view detailing the haul path 60 of FIG. 1 and shows a configuration example of an open-pit mining site where unmanned dump trucks and manned vehicles travel. Reference numeral 61 of FIG. 2 indicates a site where the excavator performs excavation. The excavator 10-1 loads topsoil and ores excavated in this area onto the unmanned dump truck 20-1. Thus, an excavation site 61 includes a loading position.

Reference numeral 62 of FIG. 2 indicates a dumping site where topsoil is spread. The topsoil and the like that are hauled from the excavation site 61 by the unmanned dump truck 20-1 are dumped and spread in layers or radially at this site.

Reference numeral 63 of FIG. 2 indicates a dumping site where a crusher (not shown) and the like for performing processing of crushing ores are disposed. The ores crushed by the crusher are hauled to a site for shipping conducted by a freight car or a processing site by means of a belt conveyor or the like. The topsoil and ores are loaded onto the unmanned dump truck 20-1 at the excavation site 61. Then, the unmanned dump truck 20-1 travels the haul path 60 to haul them to the dumping site 62 or 63.

When the excavator 10-1 is excavating topsoil at the excavation site 61, the unmanned dump truck 20-1 travels back and forth between the excavation site 61 and the dumping site 62. When the excavator 10-1 is excavating ores at the excavation site 61, the unmanned dump truck 20-1 travels back and forth between the excavation site 61 and the dumping site 63. Thus, the haul path 60 includes a haul path connecting the excavation site 61 and the dumping site 62 and a haul path connecting the excavation site 61 and the dumping site 63, these haul paths intersecting with each other at an intersection 67. Therefore, when a plurality of unmanned dump trucks is hauling different payloads, topsoil, or ores, the unmanned dump trucks could interfere with each other at the intersection 67 or the like.

Further, the haul path 60 includes two different travel paths 64 where the unmanned dump trucks 20-1 advance in different directions. Each travel path 64 includes an upbound traffic lane and a downbound traffic lane. The unmanned dump trucks 20-1 travel the haul path 60 keeping left, in the same manner as in general roads, for example.

The travel path 64 is provided as a coordinate value set on a map. More specifically, the same map information is stored in the traffic control server 31 and each unmanned dump truck 20-1. This map information includes a spot (hereinafter referred to as a "node") 65 on the map and the coordinate value of the node 65. The travel path 64 is defined by a plurality of nodes 65 and a sub link 66 connecting the adjacent nodes 65.

Figure 3:
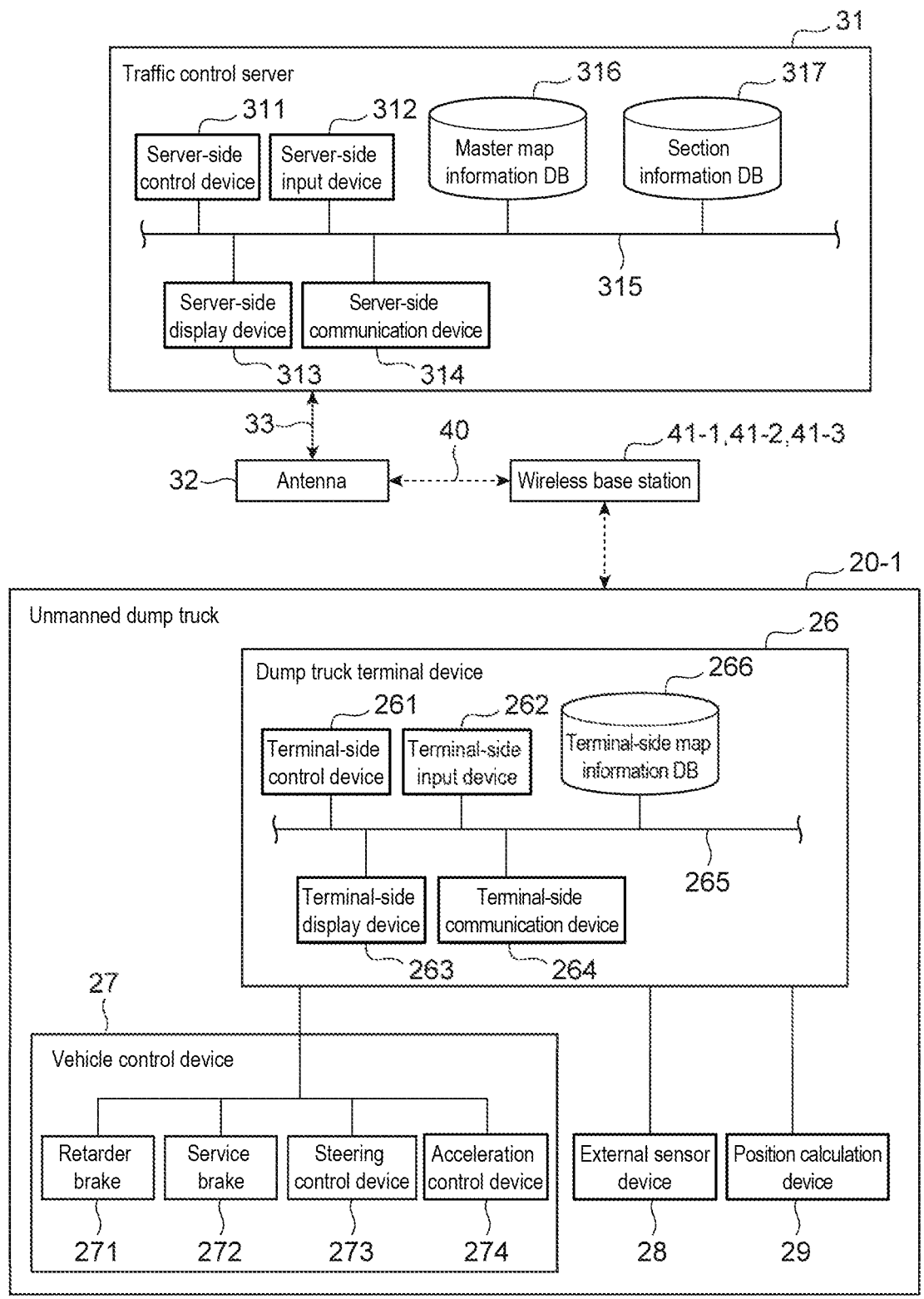
FIG. 3 shows hardware configuration diagrams of a traffic control server, an unmanned dump truck, and a dump truck terminal device.
Figure 4:
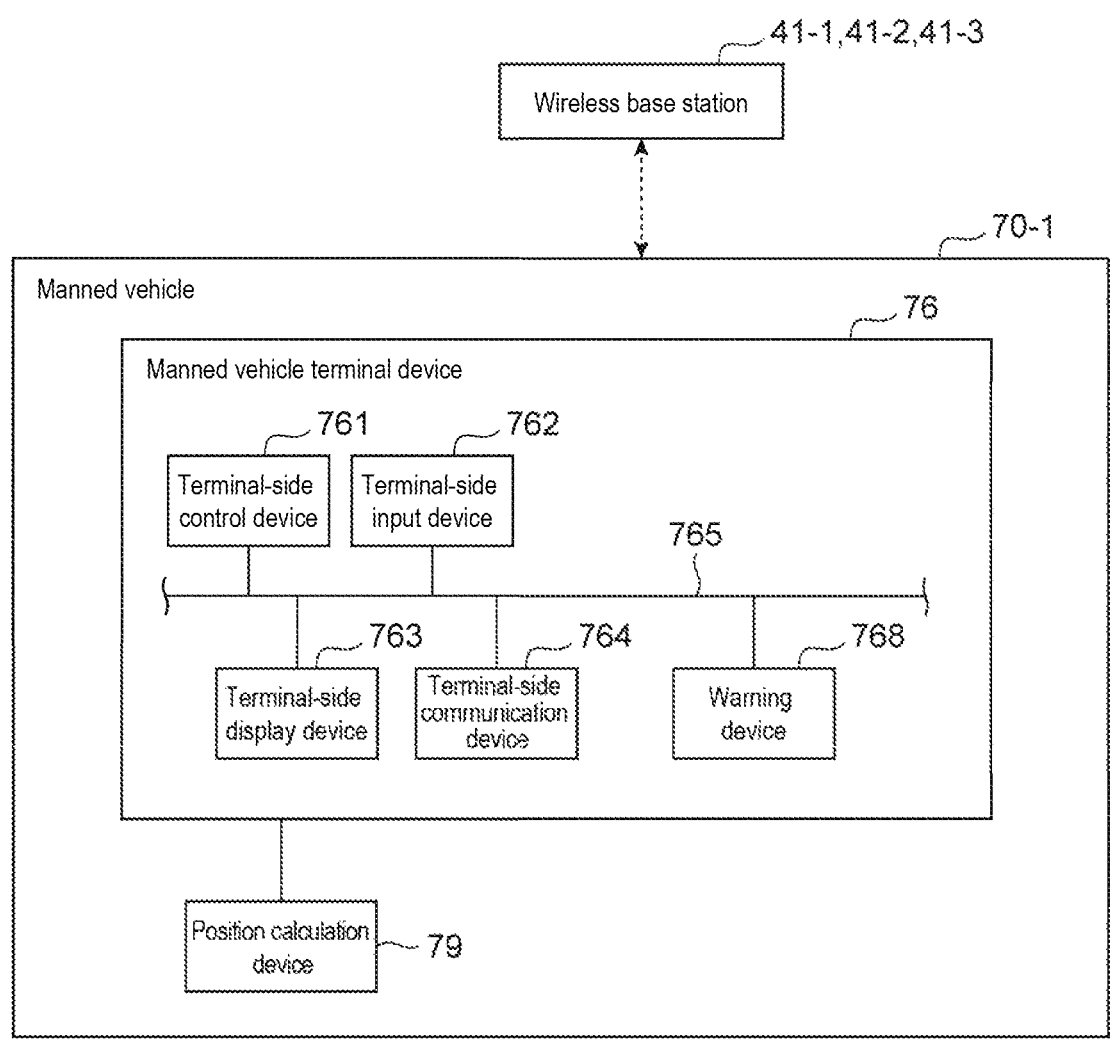
FIG. 4 shows a hardware configuration diagram of a manned vehicle terminal device.

Next, referring to FIG. 3 and FIG. 4, the hardware configurations of the traffic control server 31, the unmanned dump truck 20-1 and the dump truck terminal device 26, and the manned vehicle terminal device 76 of FIG. 1 will be described. FIG. 3 shows hardware configuration diagrams of the traffic control server 31, the unmanned dump truck 20-1, and the dump truck terminal device 26. FIG. 4 shows a hardware configuration diagram of the manned vehicle terminal device 76.

As shown in FIG. 3, the traffic control server 31 includes a server-side control device 311, a server-side input device 312, a server-side display device 313, a server-side communication device 314, a communication bus 315, a master map information database (hereinafter, the database is abbreviated as a "DB") 316, and a travel-permitted section information DB 317 (hereinafter abbreviated as a "section information DB").

The server-side control device 311 controls the operation of each component of the traffic control server 31 and is configured with hardware including a calculation and control device, such as a CPU (Central Processing Unit), and in addition, a storage device, such as a ROM (Read Only Memory) and an HDD (Hard Disk Drive) that store programs to be executed by the traffic control server 31 and a RAM (Random Access Memory) serving as a work area when the CPU executes the programs. The functional configurations of the programs executed by the traffic control server 31 will be described later with reference to FIG. 5. Further, the server-side control device 311 may be configured with an integrated circuit (ASIC: Application Specific Integrated Circuit) to implement the functions executed by the traffic control server 31.

The server-side input device 312 includes an input device, such as a mouse and a keyboard, and functions as a user interface for display of the state of the unmanned dump truck 20-1 and input of manual instructions to the unmanned dump truck 20-1.

The server-side display device 313 includes a liquid-crystal display or the like and functions as an interface to display and provide the information to the operator.

The server-side communication device 314 includes a device that establishes a communication connection with wired/wireless networks. The traffic control server 31 is connected to the antenna 32 via a wired communication network 33 and to the wireless base stations 41-1, 41-2, and 41-3 via the wireless communication network 40.

The communication bus 315 electrically connects the components to each other.

The master map information DB (master map information memory) 316 is configured with a storage device that fixedly stores information, such as an HDD, and stores map information (travel path information) defined by the position information (coordinate values) of each node on the haul path 60 and the sub-link coupling the nodes. Geographic information of a mine and absolute coordinates (three-dimensional real coordinates calculated based on the positioning radio waves) of each node may also be included. The nodes are each assigned position identification information (hereinafter referred to as a "node ID") to uniquely identify each node.

The section information DB 317 is configured with a storage device that fixedly stores information, such as an HDD, and stores section information including vehicle identification information to uniquely identify each unmanned dump truck 20-1, position information indicating the travel-permitted section assigned to each unmanned dump truck, and the current position and traveling speed of each unmanned dump truck. The vehicle identification information is preferably information that enables distinction between the unmanned dump truck and the manned vehicle. Alternatively, the section information DB 317 may also store the vehicle identification information by associating it with flags to distinguish between the unmanned dump truck and the manned vehicle.

The aforementioned DBs may include only the storage unit that stores map information or section information by allowing the server-side control device 311 to perform update and search processing of the databases or may have an engine mounted therein to perform update and search processing of the information.

Meanwhile, the unmanned dump truck 20-1 is an electrically-driven dump truck, and includes the dump truck terminal device 26 and in addition, a vehicle control device 27 to control acceleration/deceleration or steering of the unmanned dump truck 20-1 in response to the instructions from the dump truck terminal device 26, an external sensor device 28, and a position detection device 29.

The dump truck terminal device 26 includes a terminal-side control device 261, a terminal-side input device 262, a terminal-side display device 263, a terminal-side communication device 264, a communication bus 265, and a terminal-side map information DB 266.

Since the terminal-side control device 261, the terminal-side input device 262, the terminal-side display device 263, the terminal-side communication device 264, the communication bus 265, and the terminal-side map information DB 266 have the same configurations as those of the server-side control device 311, the server-side input device 312, the server-side display device 313, the server-side communication device 314, the communication bus 315, and the master map information DB 316, respectively, the overlapping descriptions will be omitted. The aforementioned terminal-side map information DB 266 stores the same map information as that stored in the master map information DB 316.

The vehicle control device 27 includes a retarder brake 271, a service brake 272, a steering control device 273, and an acceleration control device 274. The vehicle control device 27 is electrically connected to the dump truck terminal device 26, and allows the unmanned dump truck 20-1 to autonomously travel in accordance with the instructions from the traffic control server 31.

The retarder brake 271 is a brake used in normal braking. The retarder brake 271 actuates a motor included in an electrically-driven engine as a power generator and converts the kinetic energy into the electric energy for generating the regenerative power, and applies the generated regenerative power to a resistor to be consumed as the thermal energy, so that the braking force is obtained.

The service brake 272 is a brake used in emergency braking and includes a mechanical brake. Frequent use of the service brake 272 causes abrasion of the components of the mechanical brake, for example, brake pads and discs.

The steering control device 273 adjusts the steering angle of the unmanned dump truck 20-1.

The acceleration control device 274 adjusts acceleration and deceleration of the unmanned dump truck 20-1.

The external sensor device 28 is a sensor for detecting an obstacle present ahead in the traveling direction (advancing direction) of the unmanned dump truck 20-1, such as a millimeter wave radar or a front camera, and may be of any type of device. The detection results of the external sensor device 28 are output to the terminal-side control device 261 of the dump truck terminal device 26, and are used for monitoring the traveling position and acceleration/deceleration to avoid deviation from the travel path in normal times and are used for control operation required for an emergency avoidance action in the event of an emergency.

The position calculation device 29 calculates the current position of the own vehicle on the basis of the positioning radio waves from the positioning satellites 50-1, 50-2, and 50-3 (see FIG. 1). The calculated current position of the own vehicle is transmitted from the dump truck terminal device 26 to the traffic control server 31.

The dump truck terminal device 26 wirelessly communicates with and is connected to the traffic control server 31 via the wireless base stations 41-1, 41-2, and 41-3.

As shown in FIG. 4, the manned vehicle terminal device 76 also includes a terminal-side control device 761, a terminal-side input device 762, a terminal-side display device 763, a terminal-side communication device 764, and a communication bus 765 similarly to the dump truck terminal device 26. Since these components have the same configurations as those of the dump truck terminal device 26, the overlapping descriptions will be omitted.

The manned vehicle terminal device 76 includes the warning device 768 for issuing a warning to urge the driver of the manned vehicle 70-1 to perform interference avoidance operation (braking operation or steering operation) in accordance with the instructions from the traffic control server 31, in addition to the aforementioned configurations.

The warning device 768 may be of any type of device as long as it issues a warning having an effect on the five senses of the operator, such as a speaker making a warning sound or delivering a warning message, or a flashing light. Further, the warning device 768 may be configured so as to provide warning display on the screen of the terminal-side display device 763. The manned vehicle terminal device 76 is electrically connected to a position calculation device 79 that detects the current position of the manned vehicle 70-1 similarly to the dump truck terminal device 26.

The manned vehicle terminal device 76 wirelessly communicates with and is connected to the traffic control server 31 via the wireless base stations 41-1, 41-2, and 41-3.

Figure 5:
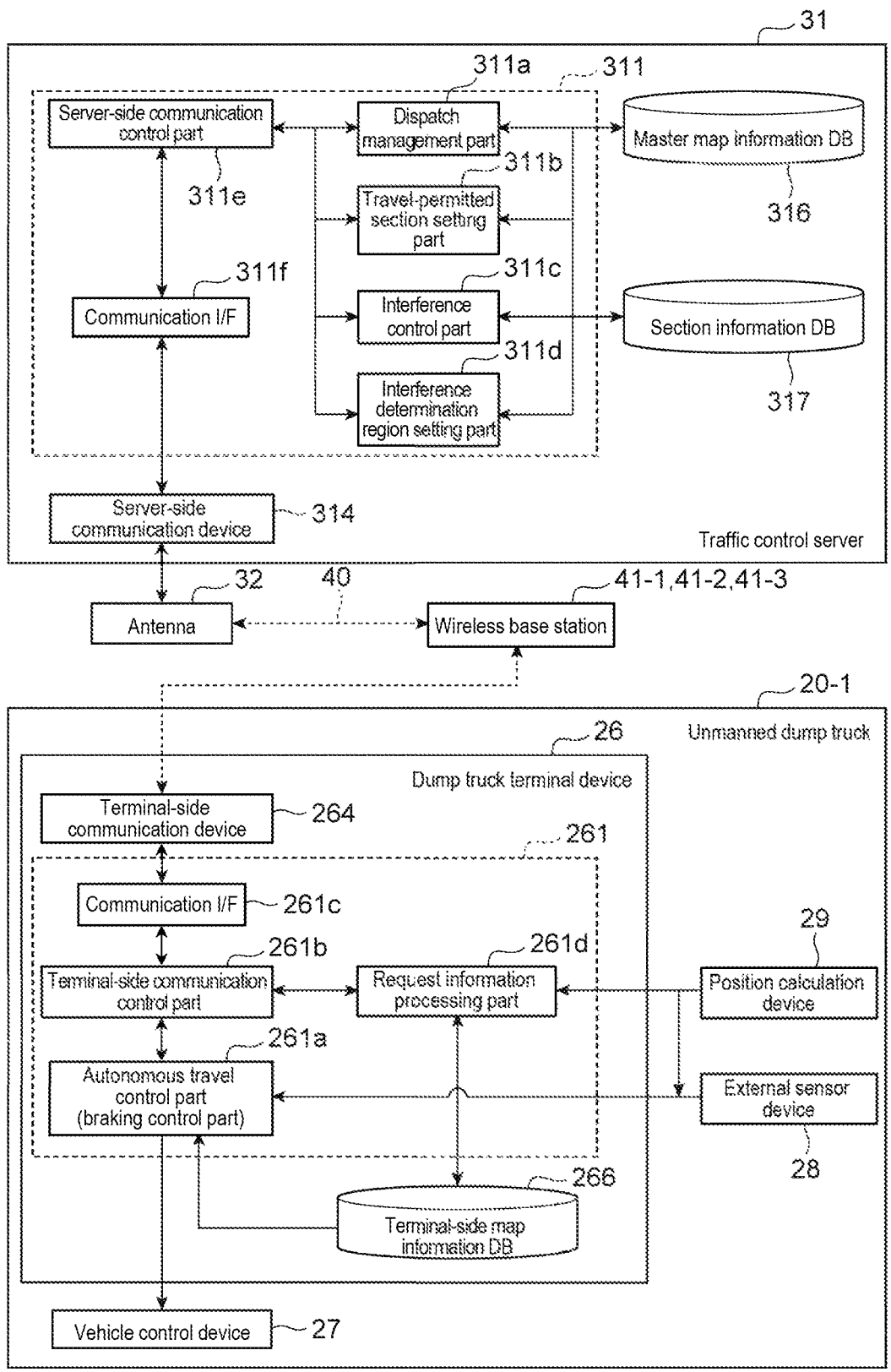
FIG. 5 shows functional block diagrams of principal functions of the traffic control server and the dump truck terminal device.
Figure 6:
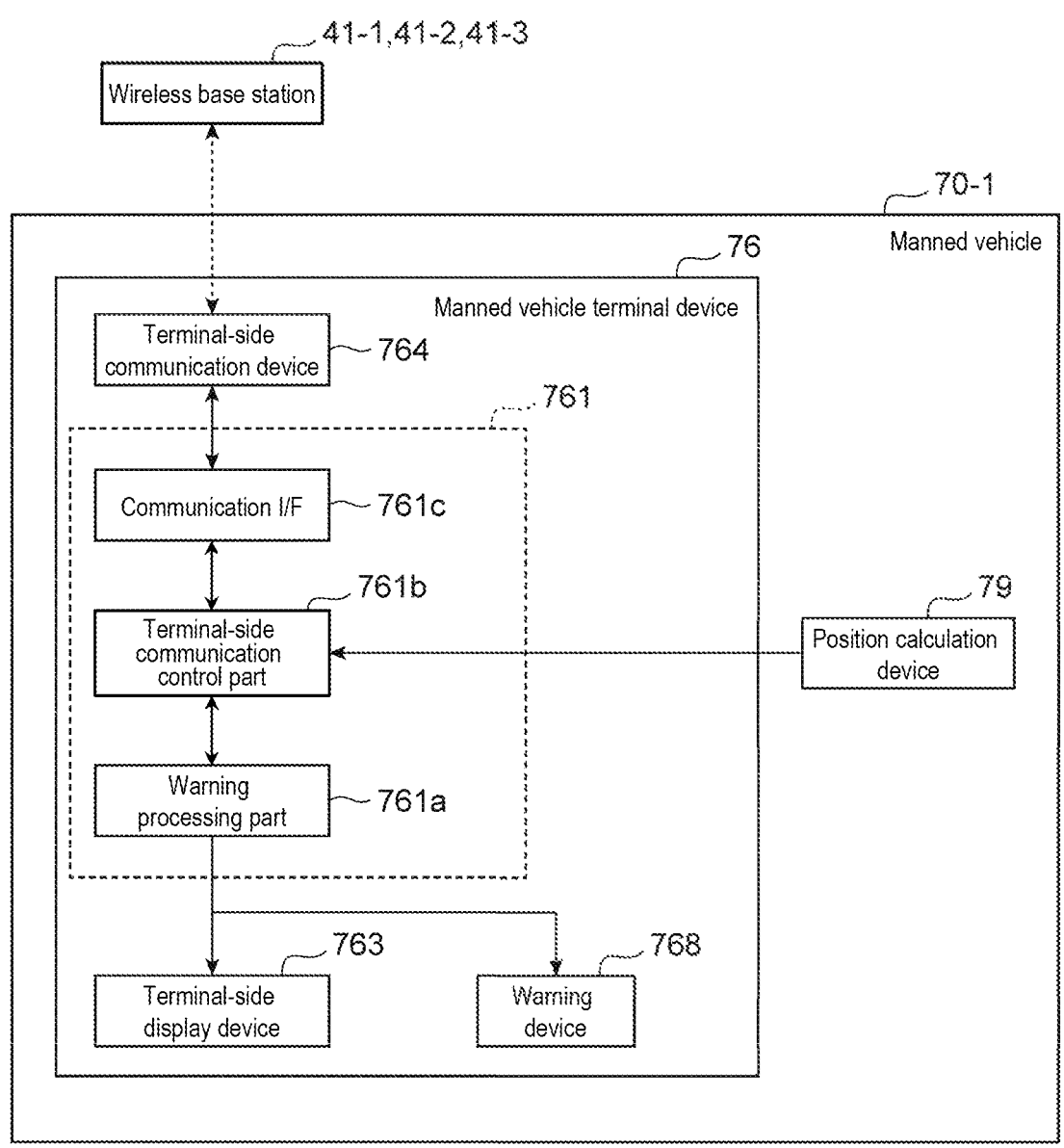
FIG. 6 shows functional block diagrams of principal functions of the traffic control server and the manned vehicle terminal device.

Next, referring to FIG. 5 and FIG. 6, the functional configurations of the traffic control server 31, the dump truck terminal device 26, and the manned vehicle terminal device 76 of FIG. 1 will be described. FIG. 5 shows functional block diagrams of principal functions of the traffic control server and the dump truck terminal device. FIG. 6 shows a functional block diagram of principal functions of the manned vehicle terminal device.

As shown in FIG. 5, the server-side control device 311 of the traffic control server 31 includes a dispatch management part 311a, a travel-permitted section setting part 311b, an interference control part 311c, an interference determination region setting part 311d, a server-side communication control part 311e, and a communication interface (hereinafter abbreviated as a "communication I/F") 311f.

The dispatch management part 311a sets a destination for the unmanned dump truck 20-1 and determines a travel path from the current position leading to the destination by referring to the map information stored in the master map information DB 316.

As an example of processing by the dispatch management part 311a, in a case where the unmanned dump truck 20-1 is in a parking area, for example, an entrance of a loading site including a loading position is set as a destination. The dispatch management part 311a then sets the travel path from the parking area leading to the entrance of the loading site. Upon setting this travel path, the dispatch management part 311a may dynamically generate the travel path in accordance with the shift in the loading position. Further, in a case where the unmanned dump truck 20-1 enters the loading position, the dispatch management part 311a sets either the dumping site 62 or 63 as the destination depending on the contents of the payload, and generates the travel path leading to the destination.

The travel-permitted section setting part 311b sets, for the unmanned dump truck 20-1, a partial section on the travel path determined by the dispatch management part 311a as a travel-permitted section where the unmanned dump truck 20-1 is permitted to travel, by referring to the map information stored in the master map information DB 316, and generates section information indicating the position of the travel-permitted section. The travel-permitted section setting part 311b updates the section information, which has been stored in the section information DB 317, by overwriting it with the section information newly generated. The section information includes a node ID of a front boundary point as a node at the frontmost end of the travel-permitted section and a node ID of a rear boundary point as a node at the rearmost end. Upon reception of information that requests the setting of a new travel-permitted section (hereinafter referred to as "request information") from the dump truck terminal device 26, in response to this, the travel-permitted section setting part 311b performs processing of setting the travel-permitted section. When the new travel-permitted section is set, the travel-permitted section setting part 311b cancels the travel-permitted section already passed and generates the section information of the travel-permitted section for the newly set travel-permitted section, and if failed, generates response information indicating non-permission of travel.

When the manned vehicle 70-1 approaches the travel-permitted section, the interference control part 311c generates warning information for issuing a warning to the driver of the manned vehicle 70-1, by referring to the section information stored in the section information DB 317. Further, the interference control part 311c generates braking instruction information to instruct the unmanned dump truck 20-1 to decelerate or to perform normal stop operation using the retarder brake 271 or emergency stop operation using the service brake 272 (retarder brake 271 concurrently used in some cases).

In order for the interference control part 311c to determine interference, the interference determination region setting part 311d sets a warning region for the unmanned dump truck 20-1 on the basis of the travel-permitted section set by the travel-permitted section setting part 311b and sets a next travel-permitted section candidate (hereinafter referred to as a "next travel-permitted section" in some cases) that is the travel-permitted section to be newly set, on the basis of the request information from the unmanned dump truck 20-1 and the travel path obtained from the dispatch management part 311a. Further, a stop trigger region for the manned vehicle 70-1 is set on the basis of the current position and speed of the manned vehicle 70-1. The interference control part 311c determines the interference state on the basis of an overlap among the aforementioned regions.

The server-side communication control part 311e controls wireless communication between the dump truck terminal device 26 and the manned vehicle terminal device 76 (FIG. 6). Specifically, braking instruction information and section information or response information (section response information) are transmitted to the dump truck terminal device 26. Further, the request information, the position information of the unmanned dump truck indicating the position of the own vehicle calculated by the position calculation device 29 of the unmanned dump truck 20-1, and the speed information of the unmanned dump truck 20-1 are received from the dump truck terminal device 26. The speed information may be configured as information indicating the speed (vector) including the traveling direction and speed (scalar quantity) based on the variations in the position information or information as a combination of the output results from a sensor mounted in the unmanned dump truck 20-1 for detecting the orientation of the vehicle body, such as a gyroscope sensor, and the speed obtained from the rotational speed of the wheels.

The communication I/F 311f includes hardware for communication and connection with the server-side communication device 314, such as a USB (Universal Serial Bus) connection terminal or the like.

Next, the dump truck terminal device 26 will be described. The terminal-side control device 261 of the dump truck terminal device 26 includes an autonomous travel control part 261a, a terminal-side communication control part 261b, a communication/F 261c, and a request information processing part 261d.

The autonomous travel control part 261a acquires the current position of the own vehicle from the position calculation device 29 and controls the vehicle control device 27 to allow the own vehicle to travel in accordance with the travel-permitted section contained in the section information, by referring to the map information in the terminal-side map information DB 266. Further, the autonomous travel control part 261a determines whether an obstacle is present ahead, on the basis of the detection results of the external sensor device 28, also determines whether operation to avoid interference or collision with the obstacle is to be performed, and performs control for control operation, if necessary. Furthermore, in accordance with the instructions from the traffic control server 31, the autonomous travel control part 261a performs drive control on a brake device included in the vehicle control device 27 to perform deceleration operation, normal stop operation, or emergency stop operation. Accordingly, the autonomous travel control part 261a also has a function as a braking control part.

The terminal-side communication control part (unmanned terminal-side communication control part) 261b controls the wireless communication with the traffic control server 31. The terminal-side communication device 261b transmits request information, and receives section information or response information (section response information) and braking instruction information.

The communication I/F 261c includes hardware for communication and connection with the terminal-side communication device 264, such as a USB (Universal Serial Bus) connection terminal or the like.

The request information processing part 261d determines whether the unmanned dump truck 20-1 has reached a request point where the request information is transmitted, on the basis of the map information stored in the terminal-side map information DB 266 and the current position calculated by the position calculation device 29, and generates the request information and transmits it to the traffic control server 31 via the terminal-side communication control part 261*b*, when the request point is reached.

Further, as shown in FIG. 6, the terminal-side control device 761 of the manned vehicle terminal device 76 mounted in the manned vehicle 70-1 includes a warning processing part 761*a*, a terminal-side communication control part 761*b*, and a communication I/F 761*c*. Since the terminal-side communication control part 761*b* and the communication I/F 761*c* have the same configurations as those of the dump truck terminal device 26, the overlapping descriptions will be omitted. It should be noted that the position information indicating the current position of the own vehicle that is calculated by the position calculation device 79 mounted in the manned vehicle 70-1 is transmitted to the traffic control server 31 via the terminal-side communication control device (manned terminal-side communication control part) 761*b*.

The warning processing part 761*a* controls the warning device 768 to issue a warning in accordance with a warning level (described later) indicated in the warning information received from the traffic control server 31 (server-side communication control part 311*e* thereof). Further, the warning processing part 761*a* indicates a warning display in accordance with the aforementioned warning level in the terminal-side display device 763.

The dispatch management part 311*a*, the travel-permitted section setting part 311*b*, the interference control part 311*c*, the interference determination region setting part 311*d*, and the server-side communication control part 311*e* included in the traffic control server 31 are implemented by the server-side control device 311 (hardware) shown in FIG. 3 executing the programs to implement these functions. Similarly, the autonomous travel control part 261*a*, the terminal-side communication control part 261*b*, and the request information processing part 261*d* included in the dump truck terminal device 26 are implemented by the terminal-side control device 261 (hardware) shown in FIG. 3 executing the programs to implement these functions. Further, the warning processing part 761*a* and the terminal-side communication control part 761*b* included in the manned vehicle terminal device 76 are implemented by the terminal-side control device 761 (hardware) shown in FIG. 4 executing the programs to implement these functions.

Figure 7:
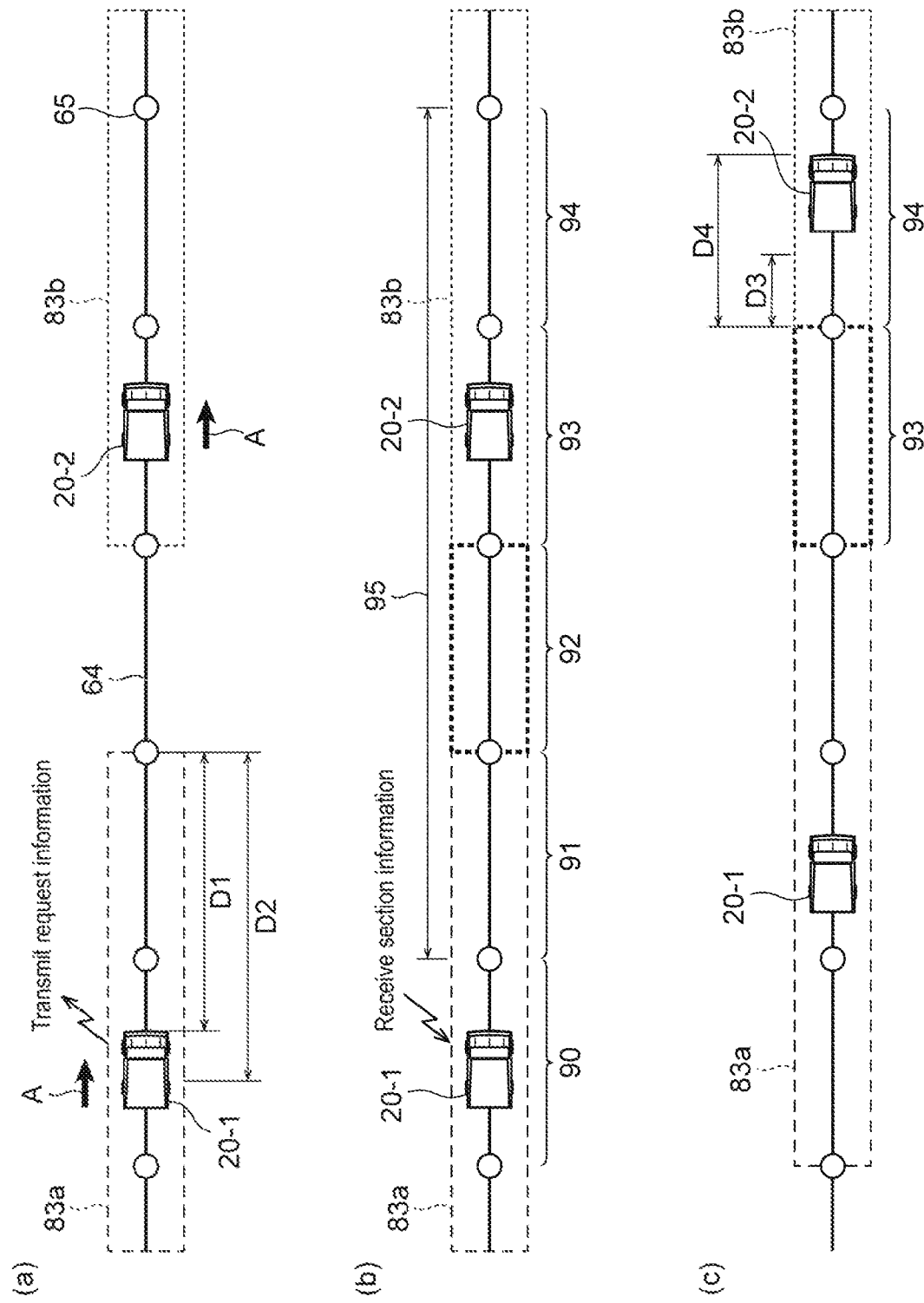
FIG. 7 shows travel-permitted section setting processing.

Next, referring to FIGS. 7A-7C, the travel-permitted section setting processing performed by the traffic control server 31 will be described. FIGS. 7A-7C show the travel-permitted section setting processing: FIG. 7A shows a travel-permitted section set for each unmanned dump truck; FIG. 7B shows a travel-permitted section newly set for the unmanned dump truck; and FIG. 7C shows a segment to be cancelled. Since the traffic control server 31 exclusively sets the travel-permitted section, the descriptions of the ravel-permitted section setting processing overlap the descriptions of the processing of avoiding interference between the unmanned dump trucks.

The unmanned dump trucks 20-1 and 20-2 shown in FIG. 7A are unmanned dump trucks traveling in the direction indicated by an arrow A. A travel-permitted section 83*a* is a travel-permitted section set for the unmanned dump truck 20-1. A travel-permitted section 83*b* is a travel-permitted section set for the unmanned dump truck 20-2. D1 is a remaining travel-permitted distance indicating the distance from the current position of the unmanned dump truck 20-1 to the front boundary point (terminal end) of the travel-permitted section 83*a* along the travel path 64. D2 is a distance in which a travel permission request is started and in which the request information is transmitted.

The distance D2 in which the travel permission request is started is longer than a distance in which the unmanned dump truck 20-1 can stop (hereinafter referred to as a "stopping available distance" represented as UVSL), which is defined as, for example, a distance obtained by adding a predetermined offset distance m as a margin to the UVSL. In this case, the distance D2 in which the travel permission request is started is represented by the following Formula (1). Further, the UVSL is calculated from the current speed of the unmanned dump truck 20-1 on the basis of the distance in which the unmanned dump truck 20-1 can stop by performing normal braking operation, i.e., braking operation mainly using the retarder brake 271, which is represented by, for example, the following Formula (2).

[Formula 1]

$$D2 = UVSL + m \quad (1)$$

wherein, m is a margin.

[Formula 2]

$$UVSL = Cu \frac{M_u v_u^2}{2 f_u} \quad (2)$$

wherein:
Cu is a coefficient defined for obtaining a stop available distance of an unmanned dump truck;
$M_u$ is a mass including a payload of the unmanned dump truck;
$v_u$ is a current speed of the unmanned dump truck; and
$f_u$ is a braking force of the unmanned dump truck.

The value of the predetermined offset distance m is set by considering, for example, the time to be required for the wireless communication and the frequency of occurrence of failures in the wireless communication. The speed v of the unmanned dump truck 20-1 may be obtained by measuring the current speed of the unmanned dump truck 20-1 from the rotational speed of the wheels or the like, or by using the maximum allowable speed set in the map information stored in the master map information DB 316 and the terminal-side map information DB 266 for the current traveling position of the unmanned dump truck 20-1.

When the remaining travel-permitted distance D1 of the unmanned dump truck 20-1 has decreased to the distance D2 in which the travel permission request is started or shorter, the unmanned dump truck 20-1 transmits request information to the traffic control server 31. The request information includes the current position information of the unmanned dump truck 20-1.

Upon reception of the request information from the unmanned dump truck 20-1, the travel-permitted section setting part 311*b* identifies the section (corresponding to the travel path 64 between the adjacent nodes 65) where the unmanned dump truck 20-1 is present on the basis of the position information contained in the transmitted request information. Then, travel permission is set over a section having a length equal to or longer than a permission-issued travel length, toward the front in the advancing direction of the unmanned dump truck 20-1 from the terminal end of the section where the unmanned dump truck 20-1 is present. However, if there is a section over which permission is already set for another vehicle, the travel permission is set up to a section right before the section that is set for the other vehicle.

In the example shown in FIG. 7B, the unmanned dump truck 20-1 is present in a segment 90 and a permission-issued travel length 95 from its terminal end includes segments 91, 92, 93, and 94. However, the segments 93 and 94 are already set for the unmanned dump truck 20-2 as the travel-permitted section 83b. Thus, the travel-permitted section candidate that can be newly set for the unmanned dump truck 20-1 includes the segments 91 and 92, but the segment 91 is included in the travel-permitted section 83a already set for the unmanned dump truck 20-1. Accordingly, the travel-permitted section setting part 311b sets only the segment 92 as the new travel-permitted section.

The travel-permitted section setting part 311b cancels, at predetermined timing, the segment where the unmanned dump truck 20-1 has passed in the section over which the travel permission is set. Specifically, as shown in FIG. 7C, when a distance D4 from the terminal end of the segment to be cancelled (segment 93 in the example shown in FIG. 7C) to the position of the unmanned dump truck 20-2 becomes equal to or longer than a predetermined travel permission canceling distance D3, the travel-permitted section setting part 311b cancels the segment. The cancelled segment (released segment) becomes available for being set as the travel-permitted section for the subsequent unmanned dump truck 20-1.

The unmanned dump trucks, for example, the unmanned dump trucks 20-1 and 20-2 can be prevented from interfering with each other by the allocation of the travel-permitted section as described above. However, since the travel-permitted section is not set for the manned vehicle 70-1, the interference cannot be avoided only by the travel-permitted section setting processing performed by the travel-permitted section setting part 311b. Thus, in the present embodiment, the interference control part 311c performs processing of avoiding interference between the manned vehicle and the unmanned vehicle. Hereinafter, the processing of avoiding interference will be described.

Figure 8:
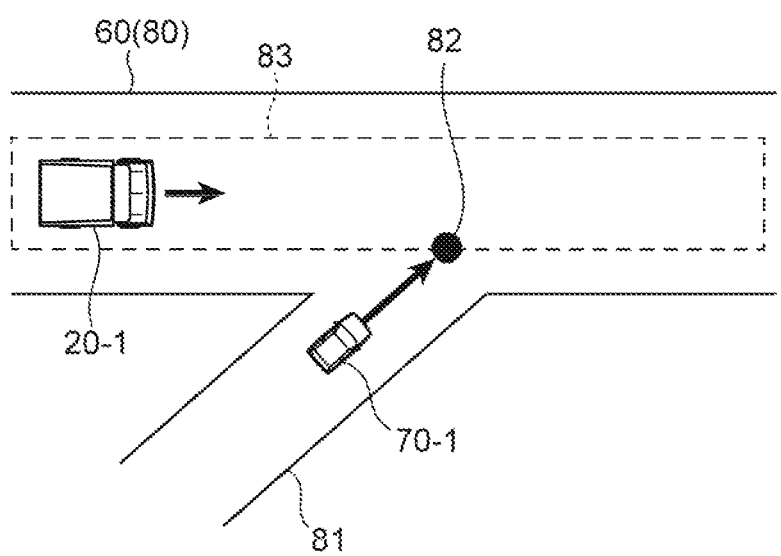
FIG. 8 shows a state of the manned vehicle interfering the travel-permitted section of the unmanned dump truck.
Figure 9:
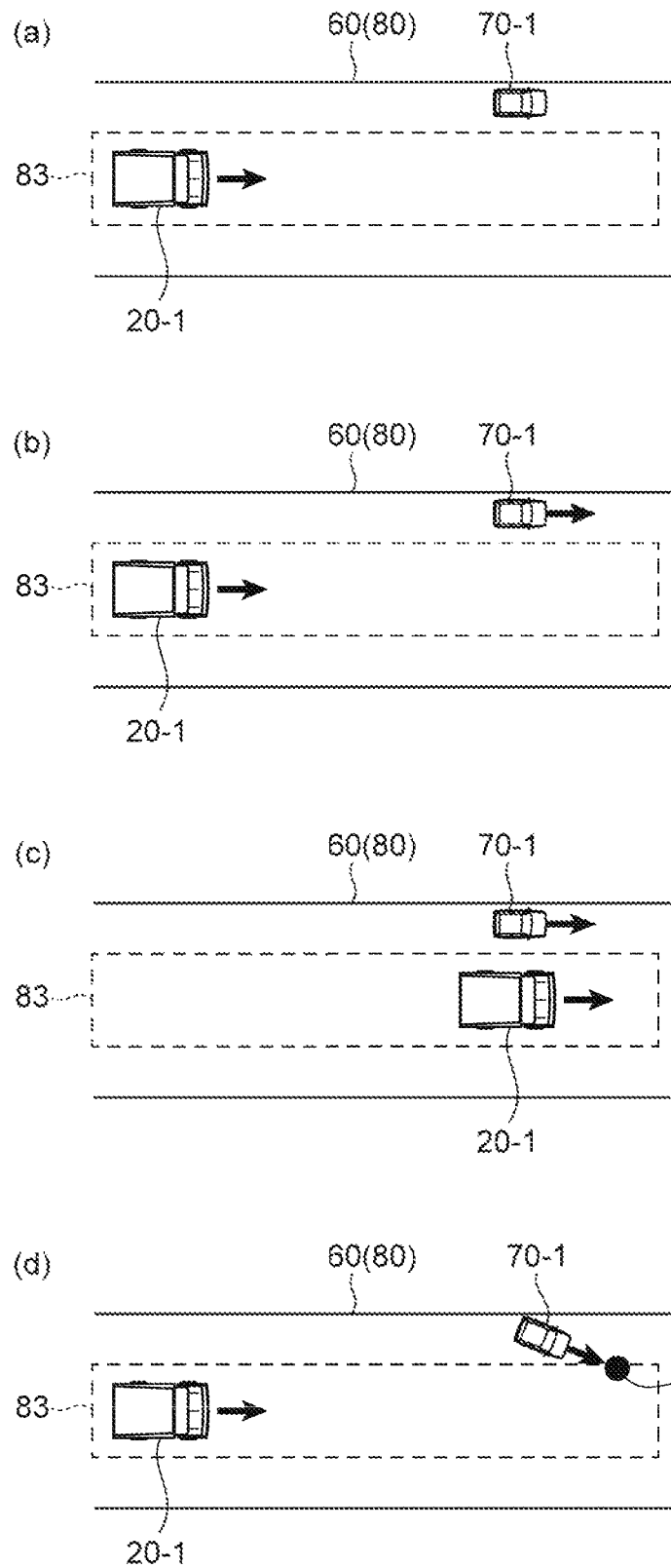
FIG. 9 shows states of the unmanned dump truck passing the side of the manned vehicle.

Referring to FIG. 8-FIGS. 10A-10C, the state requiring the processing of avoiding interference will be described. FIG. 8 shows a state of the manned vehicle interfering the travel-permitted section of the unmanned dump truck. FIGS. 9A-9D show states of the unmanned dump truck passing the side of the manned vehicle. FIGS. 10A-10C show states of the manned vehicle interrupting the advancement of the unmanned dump truck due to the presence of the manned vehicle in the next travel-permitted section candidate to be set for the unmanned dump truck.

First, referring to FIG. 8, the necessity of avoiding the state of the manned vehicle interfering the travel-permitted section of the unmanned dump truck will be described. As shown in FIG. 8, a main road 80 forming the haul path 60 intersects a side road 81 at a merging point therewith. Further, it is assumed that a travel-permitted section 83 including the merging point is set, on the main road 80, for the unmanned dump truck 20-1 by the travel-permitted section setting part 311b. Since the travel-permitted section 83 is configured as data defined by coordinate values, the driver of the manned vehicle 70-1 cannot visually recognize the travel-permitted section 83. Therefore, when attempting to enter the main road 80 from the side road 81, the manned vehicle 70-1 consequently intrudes into the travel-permitted section 83 at the merging point. Accordingly, the merging point is an interfering spot between the travel-permitted section 83 and the manned vehicle 70-1. Hereinafter, the description will be made assuming that the merging point is an interfering spot 82.

Regarding the position of the interfering spot 82, the interfering spot may be calculated such that the interference control part 311c receives the speed information (vector information) of the manned vehicle 70-1 to obtain the advancing direction of the manned vehicle 70-1 so as to predict the spot where the manned vehicle 70-1 intrudes into the travel-permitted section 83.

Next, referring to FIGS. 9A-9D, the necessity of properly calling attention of the driver of the manned vehicle when the unmanned dump truck passes the side of the manned vehicle will be described. As shown in FIGS. 9A-9D, it is assumed that the travel-permitted section 83 is set for the unmanned dump truck 20-1 traveling the main road 80 forming the haul path 60. At this time, in a case where the manned vehicle 70-1 is at a stop as shown in FIG. 9A or the manned vehicle 70-1 is traveling in the direction in which it does not intrude into the travel-permitted section 83 of the unmanned dump truck 20-1 as shown in FIG. 9B, the unmanned dump truck 20-1 can pass the side of the manned vehicle 70-1 as shown in FIG. 9C.

However, even in a state in which the unmanned dump truck 20-1 can currently pass the side of the manned vehicle 70-1, there is a possibility of interference at the interfering spot 82 due to the driving operation by the driver of the manned vehicle 70-1, such as turning or changing the direction, thus intruding into the travel-permitted section 83 of the unmanned dump truck 20-1 as shown in FIG. 9D. This is caused by the driver of the manned vehicle 70-1 failing to recognize the unmanned dump truck 20-1 passing the side of the own vehicle.

Finally, referring to FIGS. 10A-10C, the description will be made about the necessity of calling attention of the driver of the manned vehicle to the fact that the manned vehicle is interrupting the advancement of the unmanned dump truck due to its presence in the next travel-permitted section to be set for the unmanned dump truck.

As shown in FIG. 10A, it is assumed that the travel-permitted sections 83a, 83b, and 83c are set for the unmanned dump truck 20-1 traveling the main road 80 forming the haul path 60. Further, when the unmanned dump truck 20-1 advances and the remaining travel-permitted distance D1 from the current position of the unmanned dump truck 20-1 to the front boundary point (terminal end) 65c has decreased to the distance D2 in which the travel permission request is started or shorter (see FIG. 7A), the unmanned dump truck 20-1 transmits the request information to the traffic control server 31.

As described with reference to FIGS. 7A-7C, upon reception of the request information from the unmanned dump truck 20-1, the travel-permitted section setting part 311b attempts to set a next travel-permitted section candidate 1001 for the unmanned dump truck 20-1 on the basis of the position information contained in the transmitted request information. However, as shown in FIG. 10B, in a case where the manned vehicle 70-1 is present in the travel-permitted section candidate 1001 to be subsequently set, the manned vehicle 70-1 and the unmanned dump truck 20-1 could interfere with each other, and thus, the travel-permitted section setting part 311b cannot set the travel-permitted section. As shown in FIG. 10C, when the next travel-permitted section 1001 is not set, the unmanned dump truck 20-1 stops at the terminal end of the set travel-permitted section 83c. At this time, when the driver of the manned vehicle 70-1 is not called to pay attention to the fact that the vehicle is interrupting the advancement of the unmanned dump truck 20-1, the manned vehicle 70-1 may possibly be present in the advancing path of the unmanned dump truck 20-1, which results in lowering the overall productivity in the mine.

It should be noted that the travel-permitted section 83 set for the unmanned dump truck 20-1 is basically a no-entry section from the standpoint of the manned vehicle 70-1. Therefore, from the standpoint of the vehicles other than the unmanned dump truck 20-1, the travel-permitted section may be called a blocked section instead.

Herein, the warning level to classify the warning information issued to the manned vehicle 70-1 will be defined. The warning level is set in accordance with the emergency level of avoiding the interference with the travel-permitted section of the unmanned dump truck 20-1 by the manned vehicle 70-1, which is described with reference to FIG. 8-FIGS. 10A-10C.

A "warning level 3" is a level requiring the manned vehicle 70-1 to take the most urgent interference avoidance action (emergency level of avoidance is the highest). This warning level 3 is a state in which the contact with the unmanned dump truck 20-1 is inevitable unless the manned vehicle 70-1 takes the avoidance action.

Next, a "warning level 2" is a state in which the manned vehicle 70-1 is interrupting the advancement of the unmanned dump truck 20-1 due to its presence in the next travel-permitted section to be set for the unmanned dump truck 20-1. In the state of the warning level 2, the emergency level of avoidance is lower (moderate) as compared to the warning level 3, but unless the manned vehicle 70-1 takes the avoidance action, the unmanned dump truck 20-1 cannot travel, thereby lowering the productivity. Therefore, it is necessary to call attention of the manned vehicle 70-1.

Finally, a "warning level 1" is a state in which the unmanned dump truck 20-1 passes the side of the manned vehicle 70-1 and the manned vehicle 70-1 is not interrupting the traveling of the unmanned dump truck 20-1; however, it is necessary to properly call attention of the manned vehicle 70-1 to avoid future interference. The emergency level of avoidance of the warning level 1 is lower as compared to those of the warning level 3 and the warning level 2.

Figure 11:
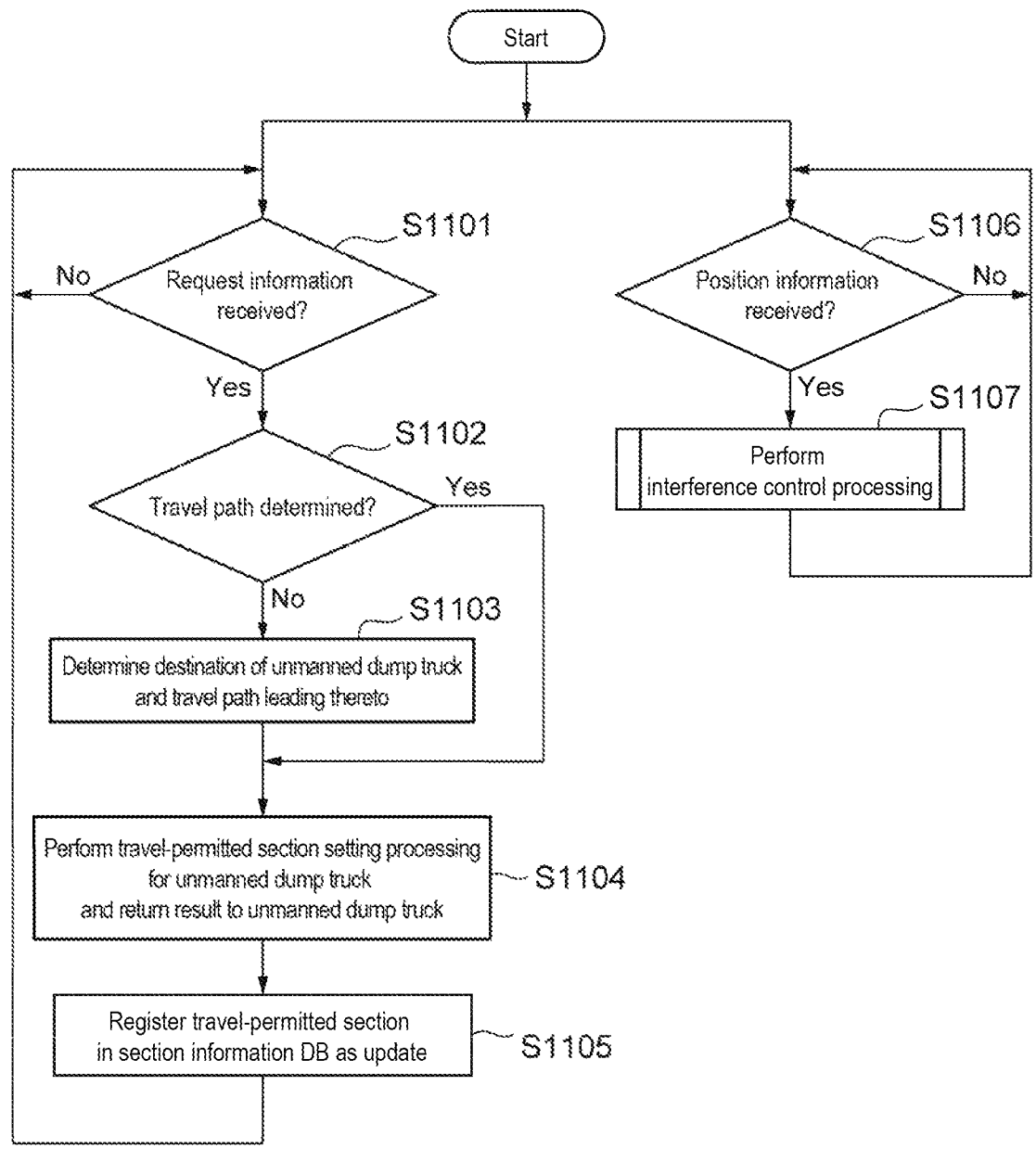
FIG. 11 is a flow chart showing a flow of processing performed by the traffic control server according to the first embodiment.
Figure 13:
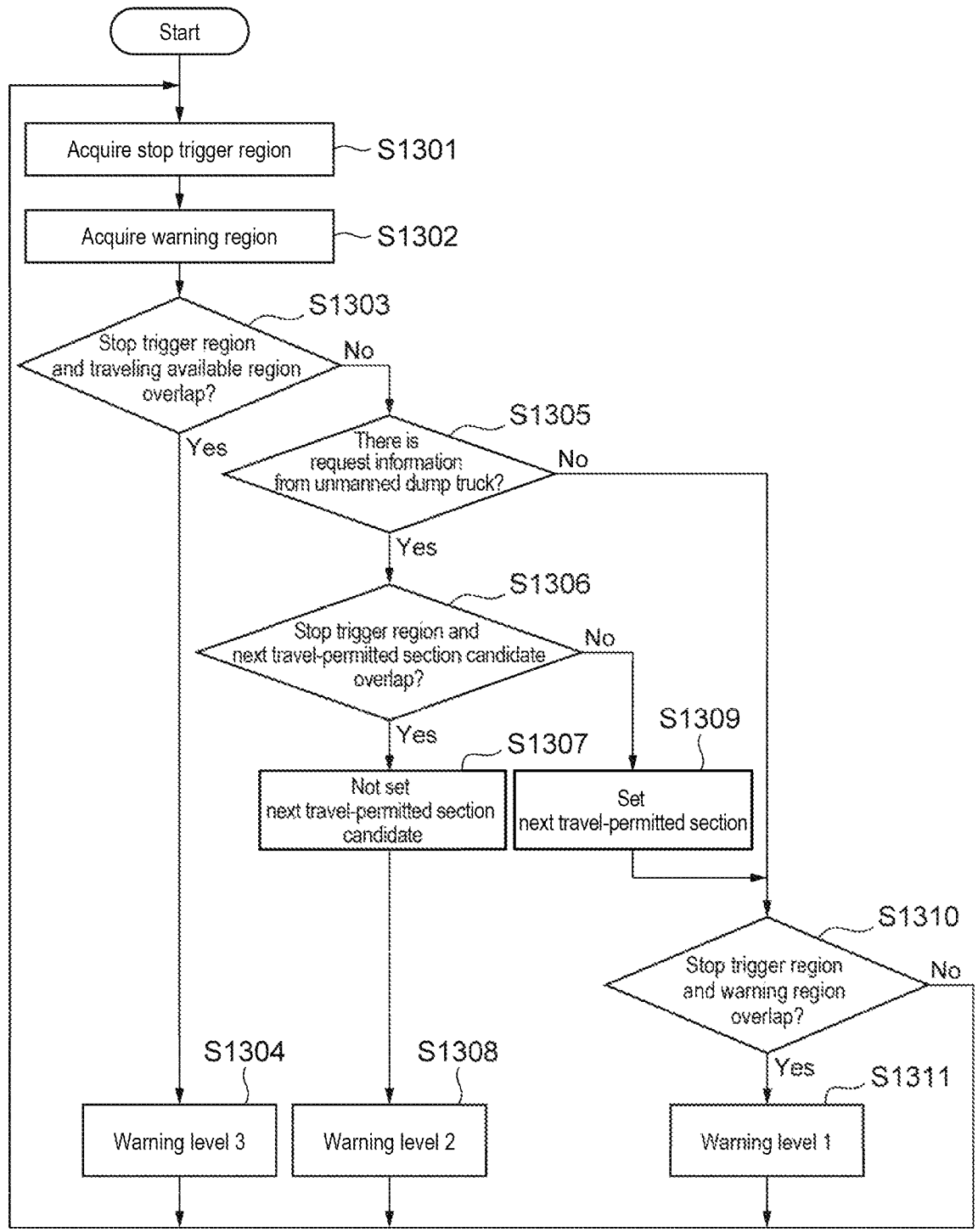
FIG. 13 is a flow chart showing a flow of the interference control processing.
Figure 14:
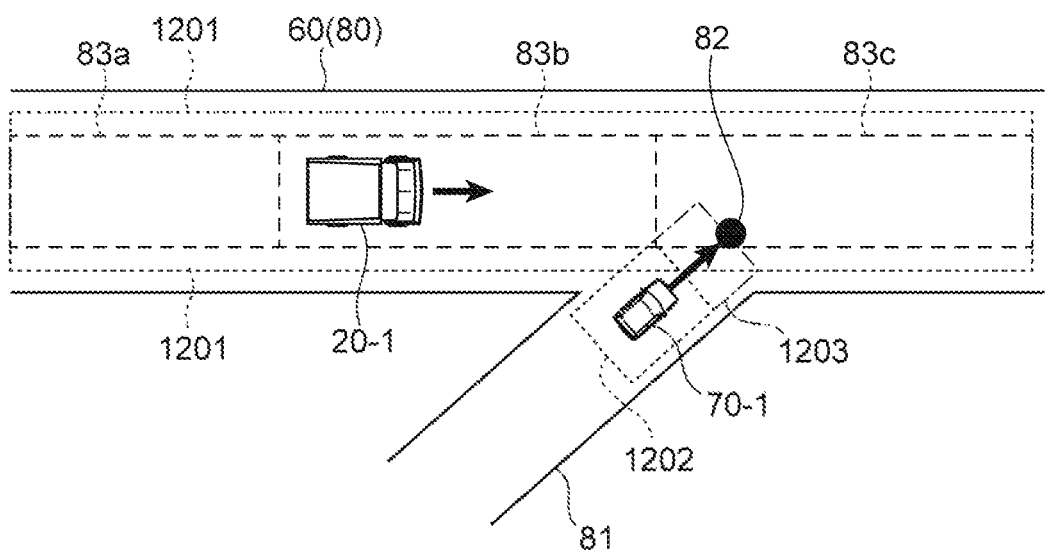
FIG. 14 shows a state of the manned vehicle intruding into a travel-permitted section of the unmanned dump truck.
Figure 17:
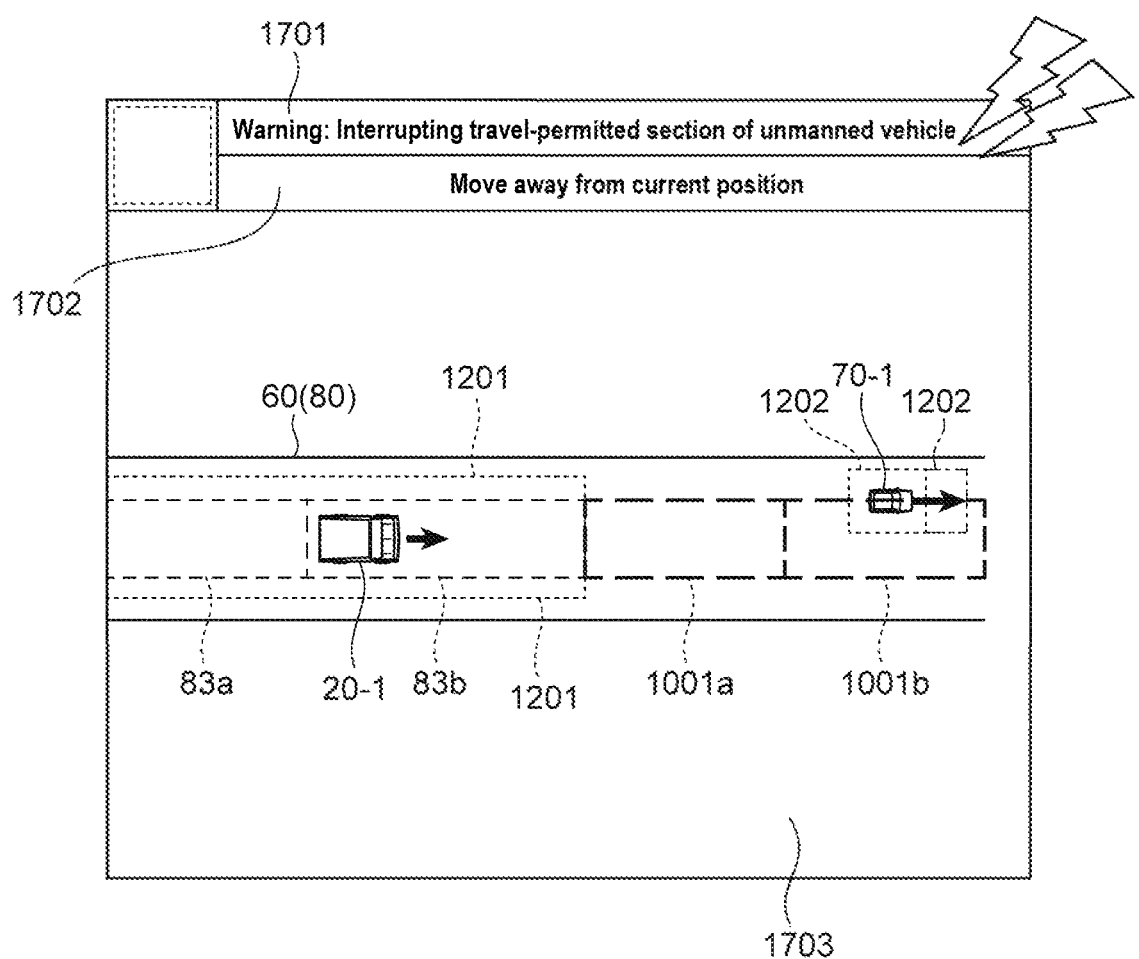
FIG. 17 shows an example of screen display of a warning level 2.
Figure 18:
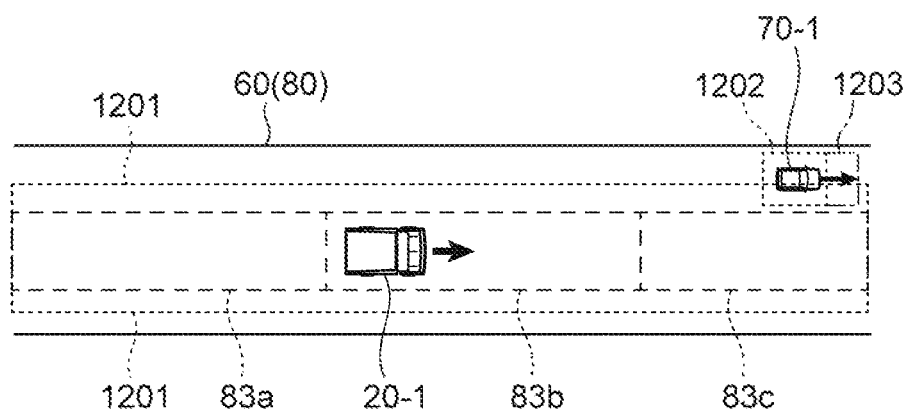
FIG. 18 shows a state of the unmanned dump truck passing the side of the manned vehicle.
Figure 19:
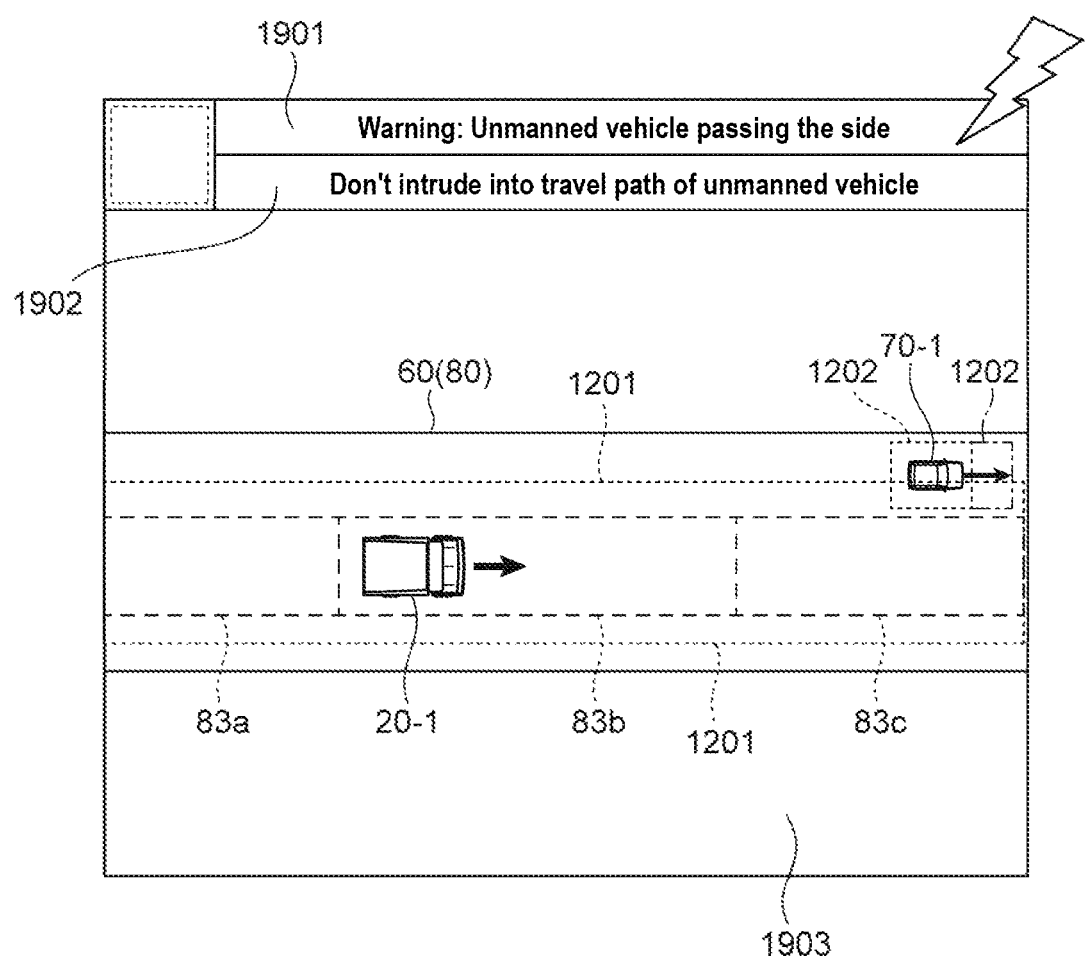
FIG. 19 shows an example of screen display of a warning level 1.

Next, referring to FIGS. 11 to 19, the processing contents of the traffic control system according to the present embodiment will be described. FIG. 11 is a flow chart showing a flow of processing performed by the traffic control server according to the first embodiment. FIGS. 12A and 12B show views for explaining regions for use in interference control processing. FIG. 13 is a flow chart showing a flow of the interference control processing. FIG. 14 shows a state of the manned vehicle intruding into the travel-permitted section of the unmanned dump truck. FIGS. 15A and 15B show examples of screen display of the warning level 3. FIGS. 16A and 16B show states of the manned vehicle interrupting the advancement of the unmanned dump truck. FIG. 17 shows an example of screen display of the warning level 2. FIG. 18 shows a state of the unmanned dump truck passing the side of the manned vehicle. FIG. 19 shows an example of screen display of the warning level 1. Hereinafter, the outline of the processing performed by the traffic control system will be described sequentially following the steps of FIG. 11.

As shown in FIG. 11, upon input of the main power, the traffic control server 31 starts the travel-permitted section setting processing (S1101-S1105) and the interference control processing (S1106-S1107) for controlling the interference with the travel-permitted section of the unmanned dump truck by the manned vehicle. These two pieces of processing are concurrently executed and the processing results of the travel-permitted section setting processing are also referred to in the interference control processing.

More specifically, upon input of the main power to the traffic control server 31, the dispatch management part 311a waits for reception of the request information from the unmanned dump truck 20-1 (S1101).

Upon reception of the request information (S1101/Yes) via the server-side communication device 314, the communication I/F 311f, and the server-side communication control part 311e, the dispatch management part 311a determines whether the travel path of the unmanned dump truck 20-1 having mounted therein the dump truck terminal device 26 that has transmitted the request information is already determined (S1102), and in a case where the travel path is already determined (S1102/Yes), the process proceeds to step S1104.

In a case where the travel path of the unmanned dump truck 20-1 is not yet determined (S1102/No), the dispatch management part 311a determines the destination and the travel path leading thereto for the unmanned dump truck 20-1 by referring to the map information stored in the master map information DB 316 (S1103).

Subsequently to step S1102 or step S1103, the travel-permitted section setting part 311b performs the travel-permitted section setting processing for the unmanned dump truck 20-1 having mounted therein the dump truck terminal device 26 that has transmitted the request information. The travel-permitted section setting part 311b performs processing of setting a new travel-permitted section for the unmanned dump truck 20-1 by referring to the position information of the unmanned dump truck contained in the request information, the map information in the master map information DB 316, and the section information in the section information DB 317 in which the information of the travel-permitted sections set for the other dump trucks is registered (see FIGS. 7A-7C).

In a case where the travel-permitted section was able to be set, the travel-permitted section setting part 311b generates the section information of the newly set travel-permitted section including its front boundary point and rear boundary point and returns the section information to the dump truck terminal device 26 that has transmitted the request information. The section information may further include information indicating the speed limit of the section. In a case where the travel-permitted section was unable to be set, the travel-permitted section setting part 311b generates the response information indicating non-permission and returns the response information to the unmanned dump truck 20-1 (S1104).

When the unmanned dump truck 20-1 receives the response information, it repeats transmitting the request information until it reaches the terminal end of the travel-permitted section 83. The unmanned dump truck 20-1 stops retransmitting the request information upon reception of the section information, and stops upon reaching the terminal end without receiving the section information.

In a case where the travel-permitted section was able to be set, the travel-permitted section setting part 311b records the travel-permitted section newly set for the unmanned dump truck 20-1 as a next travel-permitted section, which will be described later, while the travel-permitted section setting part 311b cancels the travel-permitted section where the unmanned dump truck 20-1 has already passed and registers the section information of the newly set travel-permitted section as an update in the section information DB 317 (S1105). Then, the process returns to step S1101 and the request information is waited to be received.

Meanwhile, after the input of the main power to the traffic control server 31, the interference control part 311c waits for reception of the position information of the manned vehicle 70-1 from the manned vehicle terminal device 76 mounted in the manned vehicle 70-1 (S1106).

The driver of the manned vehicle 70-1 turns on the main power of the manned vehicle terminal device 76 prior to the start of driving of the manned vehicle 70-1. Thus, the detection of the current position by the position calculation device 79 mounted in the manned vehicle 70-1 is started. The manned vehicle terminal device 76 transmits the position information of the manned vehicle to the traffic control server 31 via the wireless communication network 40.

Upon reception of the position information of the manned vehicle 70-1 via the server-side communication device 314, the communication I/F 311f, and the server-side communication control art 311e (S1106/Yes), the interference control part 311c starts the interference control processing (S1107).

Prior to the detailed description of the interference control processing, the regions used for the interference control processing will be described by referring to FIGS. 12A and 12B. FIG. 12A shows a warning region and next travel-permitted sections of the unmanned dump truck and FIG. 12B shows a stop trigger region of the manned vehicle. These warning region and next travel-permitted sections of the unmanned dump truck and the stop trigger region of the manned vehicle are set by the interference determination region setting part 311d.

As shown in FIG. 12A, it is assumed that a region around the travel-permitted sections 83a and 83b set by the travel-permitted section setting part 311b, specifically, a region extended only by a predetermined offset distance n in the widthwise direction relative to the travel-permitted sections 83a and 83b set by the travel-permitted section setting part 311b is a warning region 1201 of the unmanned dump truck 20-1. Further, it is assumed that the travel-permitted sections to be newly and subsequently set by the travel-permitted section setting part 311b relative to the remaining distance of the travel-permitted section set for the unmanned dump truck 20-1 are next travel-permitted section candidates 1001a and 1001b.

As shown in FIG. 12B, the stop trigger region is a region where the manned vehicle 70-1 can stop that is around and in the vicinity of the manned vehicle 70-1, specifically, a region as a combination of a region 1202 extended only by the offset distance n in the front-back and left-right directions relative to the manned vehicle 70-1 and a region 1203 extended only by a distance MVSL in which the manned vehicle 70-1 can stop in the forward direction of the manned vehicle 70-1. The method for calculation of the distance MVSL in which the manned vehicle 70-1 can stop is the same as that for calculation of the distance UVSL in which the unmanned dump truck 20-1 can stop (see Formula (2)).

It should be noted that the offset distance n for the warning region 1201 and the offset distance n for the stop trigger region (1202, 1203) are herein set at the same value, but it is obvious that the values may be differentiated in accordance with the operation performance of the unmanned dump truck 20-1 and the manned vehicle 70-1 or the like.

Hereinafter, the interference control processing will be described sequentially following the steps of FIG. 13.

As described above, the interference control part 311c acquires, from the interference determination region setting part 311d, the stop trigger region set on the basis of the current position and the speed of the manned vehicle 70-1 (S1301), and acquires the warning region set on the basis of the travel-permitted section set for the unmanned dump truck 20-1 (S1302).

Next, the interference control part 311c determines whether the stop trigger region set for the manned vehicle 70-1 and a traveling available region (namely, travel-permitted section) of the unmanned dump truck 20-1 overlap with each other (S1303).

In a case where the stop trigger region and the traveling available region overlap with each other (S1303/Yes), such a case means that there is a possibility that the manned vehicle 70-1 is intruding into the travel-permitted section (83a, 83b, 83c) set for the unmanned dump truck 20-1, as shown in FIG. 14. Thus, the distance from the current position of the manned vehicle 70-1 to the interfering spot 82 where the unmanned dump truck 20-1 and the manned vehicle 70-1 could interfere with each other is calculated. Then, the interference avoidance action is taken for the manned vehicle 70-1 and the unmanned dump truck 20-1 in stages in accordance with the calculated distance (S1304).

Further, in a case where there is a possibility that the manned vehicle 70-1 intrudes into the travel-permitted section of the unmanned dump truck 20-1, the warning of the warning level 3 needs to be issued to the driver of the manned vehicle 70-1. The interference control part 311c generates the warning information (warning information corresponding to the warning level 3) indicating that there is a possibility that the manned vehicle 70-1 intrudes into the travel-permitted section of the unmanned dump truck 20-1, and the warning information is transmitted and notified to the manned vehicle 70-1 from the server-side communication control part 311e (S1304).

FIGS. 15A and 15B show examples of screen display of the warning level 3 in the terminal-side display device 763 of the manned vehicle 70-1. The components of the screen include an area 1501 that shows a warning message to the manned vehicle, an area 1502 that shows how to address, and an area 1503 that shows the interference state between the manned vehicle and the unmanned dump truck.

For example, the area 1501 that shows the warning message indicates the interference with the unmanned vehicle (unmanned dump truck) and the area 1502 that shows how to address indicates that an immediate interference avoidance action is urged to be taken.

The area 1503 that shows the interference state indicates the map information of the manned vehicle 70-1 traveling, and in addition, information necessary for avoiding interference including the stop trigger regions (1202, 1203) set for the manned vehicle 70-1, the unmanned vehicle 20-1, the travel-permitted section 83 of the unmanned vehicle 20-1, and the merging point (interfering spot) 82 between the unmanned dump truck 20-1 and the manned vehicle 70-1 or the like. This assists in determining what action should be taken.

For example, as shown in FIG. 15A, the warning may be issued to the driver of the manned vehicle 70-1 by displaying the screen indicating the state of interference with the unmanned dump truck 20-1 in the terminal-side display device 763 of the manned vehicle 70-1 or by making a warning sound by the warning device 768. Further, the display screen may have its upper side directed toward the north as shown in FIG. 15A or its upper side directed in the advancing direction of the manned vehicle as shown in FIG. 15B.

Further, in the warning processing (S1304) of the warning level 3, the interference control part 311c may generate braking instruction information to perform the interference avoidance action, as necessary, in accordance with the calculated distance, and transmit the braking instruction information to the dump truck terminal device 26 of the unmanned dump truck 20-1.

Meanwhile, in a case where the stop trigger region and the traveling available region do not overlap with each other (S1303/No), the interference control part 311c determines whether there is request information on an update of the travel-permitted section from the unmanned dump truck 20-1 (S1305).

In a case where there is the request information on an update of the travel-permitted section from the unmanned dump truck 20-1 (S1305/Yes), it is determined whether the stop trigger region and the next travel-permitted section candidate to be subsequently set for the unmanned dump truck 20-1 overlap with each other (S1306).

In a case where the stop trigger region and the next travel-permitted section candidate of the unmanned dump truck 20-1 overlap with each other (S1306/Yes), such a case means that the manned vehicle 70-1 is present in the next travel-permitted section to be subsequently set for the unmanned dump truck 20-1 as shown in FIGS. 16A and 16B. In this case, the interference control part 311c does not set, for the unmanned dump truck 20-1, the next travel-permitted section candidate that overlaps with the stop trigger region (S1307).

For example, in the examples shown in FIGS. 16A and 16B, it is assumed that the next travel-permitted section candidates to be subsequently set for the unmanned dump truck 20-1 on the basis of the request information are 1001a and 1001b. In this case, as shown in FIG. 16A, the stop trigger regions (1202, 1203) do not overlap with the next travel-permitted section candidate 1001a, but overlap with the next travel-permitted section candidate 1001b. Then, the interference control part 311c sets the next travel-permitted section candidate 1001a for the unmanned dump truck 20-1, but does not set the next travel-permitted section candidate 1001b. At this time, as shown in FIG. 16B, the next travel-permitted section candidate 1001a becomes the travel-permitted section 83c and accordingly, the warning region 1201 is also extended so as to encompass the travel-permitted section 83c.

Further, the interference control part 311c generates the warning information (warning information corresponding to the warning level 2) indicating that the manned vehicle 70-1 is interrupting the advancement of the unmanned dump truck 20-1, and the warning information is transmitted and notified to the manned vehicle 70-1 from the server-side communication control part 311e (S1308).

FIG. 17 shows an example of screen display of the warning level 2. As shown in FIG. 17, with the screen display of the warning information to the manned vehicle 70-1 in the terminal-side display device 763, the manned vehicle 70-1 is urged to move away from the next travel-permitted section of the unmanned dump truck 20-1 so as to avoid the overlapping between the stop trigger region and the next travel-permitted section candidate. For example, an area 1701 that shows a warning message indicates that the travel-permitted section of the unmanned vehicle (unmanned dump truck) is interrupted, and an area 1702 that shows how to address indicates moving away from the current position. Further, an area 1703 shows the interference state, thereby assisting the determination on the direction in which the movement should be made.

Further, the warning may be issued to the driver of the manned vehicle 70-1 such that the warning device 768 makes a warning sound in accordance with the warning level 2 of the warning information.

Meanwhile, in a case where the stop trigger region and the next travel-permitted section candidate do not overlap with each other (S1306/NO), there is request information on the update of the travel-permitted section from the unmanned dump truck 20-1 and the manned vehicle 70-1 is not present in the next travel-permitted section, and thus, the next travel-permitted section is set for the unmanned dump truck 20-1 (S1309).

In a case where the next travel-permitted section is set (S1309) or there is no request information on the update of the travel-permitted section from the unmanned dump truck 20-1 (S1305/No), it is determined whether the stop trigger region and the warning region overlap with each other (S1310).

In a case where the stop trigger region and the warning region of the unmanned dump truck 20-1 overlap with each other (S1310/Yes), such a case means that the unmanned dump truck 20-1 is approaching the manned vehicle 70-1 and is about to pass its side as shown in FIG. 18. Thus, the interference control part 311c generates the warning information (warning information corresponding to the warning level 1) indicating that the unmanned dump truck 20-1 is approaching the manned vehicle 70-1, and the warning information is transmitted and notified to the manned vehicle 70-1 from the server-side communication control part 311e (S1311). In this situation, the stop trigger regions (1202, 1203) and the warning region 1201 of the unmanned dump truck 20-1 overlap with each other, but the stop trigger regions (1202, 1203) and the travel-permitted section 83 do not overlap with each other, and thus, it is ensured that the unmanned dump truck 20-1 can pass the side of the manned vehicle 70-1.

FIG. 19 shows an example of screen display of the warning level 1. As shown in FIG. 19, with the screen display of the warning information indicating that the unmanned dump truck 20-1 passes the side of the manned vehicle 70-1 in the terminal-side display device 763, the driver of the manned vehicle 70-1 can recognize that the unmanned dump truck 20-1 approaches and passes its side. Further, for example, an area 1901 that shows a warning message indicates a message that the unmanned vehicle (unmanned dump truck) is passing, and an area 1902 that shows how to address indicates a message for calling attention to avoiding intrusion into the travel path of the unmanned vehicle (unmanned dump truck). Furthermore, an area 1903 shows the interference state (in this case, the positional relation of non-interference), thereby assisting in determining the direction from which the unmanned vehicle is approaching. By calling attention as such, the attention can be paid to unnecessary intrusion into the travel-permitted section 83 of the unmanned dump truck 20-1 by the manned vehicle 70-1.

Further, the warning may be issued to the driver of the manned vehicle 70-1 such that the warning device 768 makes a warning sound in accordance with the warning level 1 of the warning information.

Finally, in a case where the stop trigger region and the warning region of the unmanned dump truck 20-1 do not overlap with each other (S1310/No), or after the warning information is entirely notified (S1304, S1308, S1311), the process returns to the initial processing S1301 of the interference control processing and the interference control processing is repeated.

As described above, in the present embodiment, the interference control part 311c of the traffic control server 31 generates the warning information for performing at least one of displaying a warning screen and making a warning sound to the manned vehicle 70-1 in accordance with the overlap (interference) among the stop trigger region of the manned vehicle 70-1, the travel-permitted section set for the unmanned vehicle 20-1, the next travel-permitted section that is the travel-permitted section to be subsequently set for the unmanned vehicle 20-1, and the warning region set for the travel-permitted section, and the server-side communication control part 311e transmits the warning information to the manned vehicle 70-1.

Further, the interference control part 311c generates the warning information of the highest emergency level of avoidance (warning level 3) in a case where an overlap exists between the stop trigger region of the manned vehicle 70-1 and the travel-permitted section set for the unmanned vehicle 20-1, generates the warning information of the moderate emergency level of avoidance (warning level 2) in a case where an overlap exists between the stop trigger region of the manned vehicle 70-1 and the next travel-permitted section to be subsequently set for the unmanned vehicle 20-1, and generates the warning information of the lowest emergency level of avoidance (warning level 1) in a case where an overlap exists between the stop trigger region of the manned vehicle 70-1 and the warning region.

Further, the interference control part 311c generates the warning information and generates braking instruction information to cause the unmanned vehicle 20-1 to perform a braking operation, and the server-side communication control part 311e transmits the warning information to the manned vehicle 70-1 and transmits the braking instruction information to the unmanned vehicle 20-1.

Furthermore, the manned vehicle 70-1 includes the display device 763 that wirelessly communicates with and is connected to the traffic control server 31 and that displays the warning information, and the screen display of the display device 763 is changed on the basis of the warning information generated in accordance with the overlap (interference) among the stop trigger region of the manned vehicle 70-1, the travel-permitted section set for the unmanned vehicle 20-1, the next travel-permitted section that is the travel-permitted section to be subsequently set for the unmanned vehicle 20-1, and the warning region set for the travel-permitted section.

According to the present embodiment, the user (driver of the manned vehicle 70-1) is urged to take avoidance action so as to enable to prioritize the advancement of the unmanned vehicle 20-1, and the safety can be secured by interference avoidance and the productivity can be improved as well.

Second Embodiment

Figure 20:
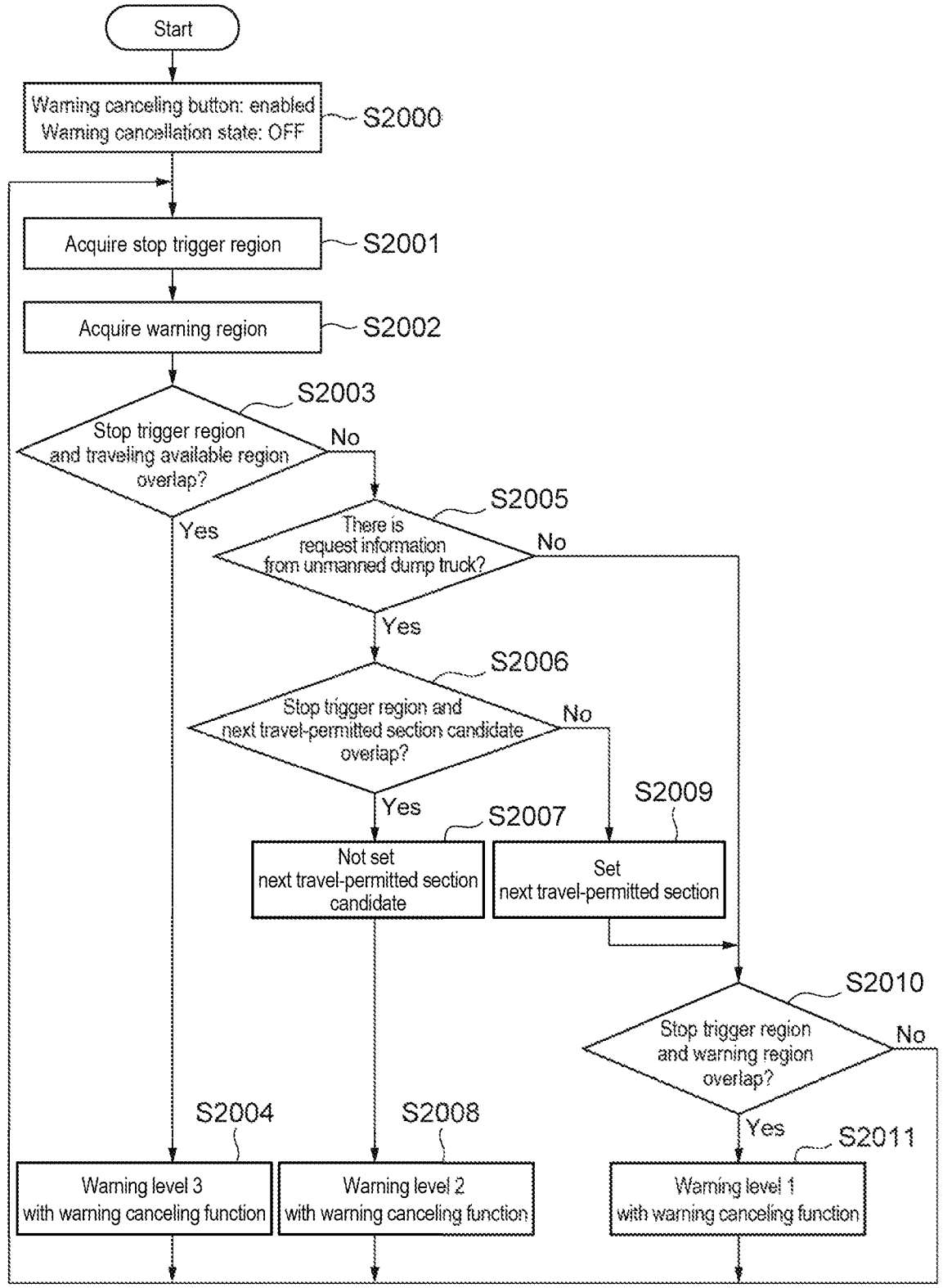
FIG. 20 is a flow chart showing a flow of the interference control processing including a warning information canceling function according to a second embodiment.
Figure 21:
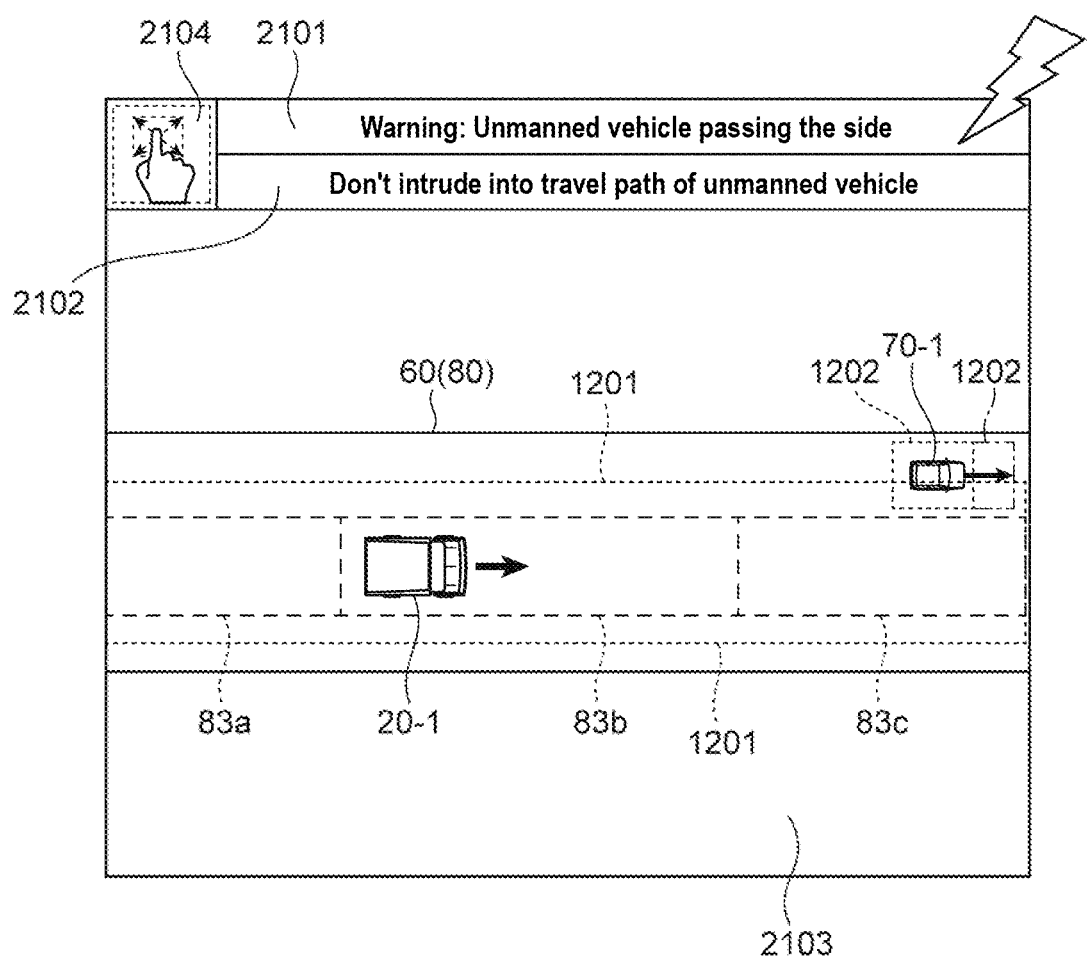
FIG. 21 shows an example of screen display in the interference control processing including the warning information canceling function.

Further, in the aforementioned first embodiment, a function of canceling the warning information in accordance with the warning level may be provided. The warning information canceling function can be implemented with parameters for determining whether the state allows (enabled state) or does not allow (disabled state) a warning canceling button to be pressed and for managing the state of whether the warning has been cancelled. FIG. 20 is a flow chart showing a flow of the interference control processing including the warning information canceling function according to a second embodiment. FIG. 21 shows an example of screen display in the interference control processing including the warning information canceling function. Further, FIGS. 22A-22C show examples of screen display of the warning canceling button.

Hereinafter, the interference control processing including the warning information canceling function will be described sequentially following the steps of FIG. 20.

The interference control part 311c transmits the information for setting (setting information) the warning canceling button to the manned vehicle terminal device 76 of the manned vehicle 70-1, so that the warning canceling button with which the user cancels the warning is enabled (can be pressed) and the warning cancellation state, by which it is determined whether the user has pressed the canceling button, is set to be OFF (not pressed)(S2000). For example, as shown in 2104 of FIG. 21, the warning canceling button is arranged in a position (in the example shown in FIG. 21, on the upper left of the display screen of the terminal-side display device 763 of the manned vehicle 70-1) where the user of the manned vehicle 70-1 can visually recognize. It should be noted that the warning canceling button may be arranged in a position other than the display screen of the terminal-side display device 763 or may be configured as a physical button or switch.

FIGS. 22A-22C show examples of states of the warning canceling button. The state in which the user of the manned vehicle 70-1 can press the warning canceling button is the state in which the warning canceling button is enabled as shown in FIG. 22A. Meanwhile, the state in which the warning canceling button cannot be pressed is shown in FIG. 22B, that is, the state in which the warning canceling button is disabled. Further, the state in which the warning canceling button is enabled and the warning canceling button is pressed is shown in FIG. 22C, which means that the warning has been cancelled.

Next, similarly to the first embodiment, the interference control part 311c acquires, from the interference determination region setting part 311d, the stop trigger region set on the basis of the current position and the speed of the manned vehicle 70-1 (S2001), and acquires the warning region set on the basis of the travel-permitted section set for the unmanned dump truck 20-1 (S2002).

Similarly to the first embodiment, in a case where the stop trigger region and the traveling available region overlap with each other (S2003/Yes), there is a possibility that the manned vehicle 70-1 is intruding into the travel-permitted section (83a, 83b, 83c) set for the unmanned dump truck 20-1, as shown in FIG. 14, which means that the state is the warning level 3 requiring the avoidance of interference with the unmanned dump truck 20-1. Thus, in the warning level 3 requiring the avoidance of interference with the unmanned dump truck 20-1, the user is not allowed to cancel the warning information.

Figure 23:
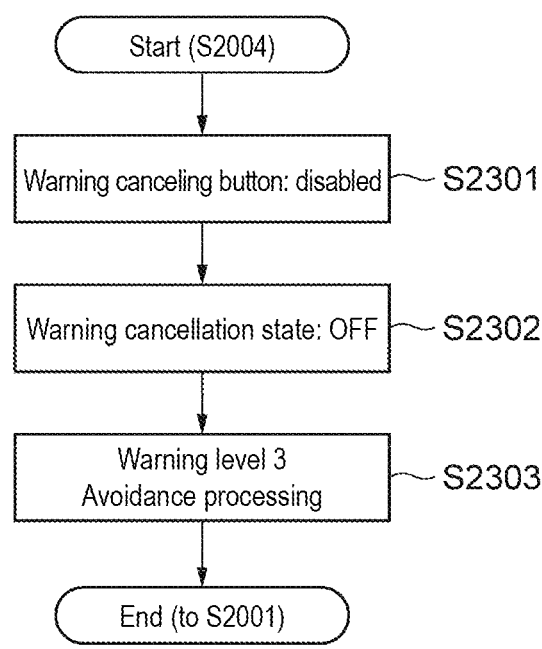
FIG. 23 is a flow chart showing a flow of warning processing of the warning level 3 including the warning information canceling function.

FIG. 23 is a flow chart showing a flow of the warning processing of the warning level 3 (S2004) including the warning information canceling function. The interference control part 311c disables the warning canceling button for canceling the warning information (S2301), so as to disable the cancellation of the warning information. This is because in the state of the warning level 3, the manned vehicle 70-1 should prioritize most the avoidance of interference with the unmanned dump truck 20-1. Then, similarly to S1304 of the first embodiment, while keeping the warning cancellation state OFF (S2302), the warning information (warning information corresponding to the warning level 3) indicating that there is a possibility that the manned vehicle 70-1 intrudes into the travel-permitted section of the unmanned dump truck 20-1 is generated, and the warning information is transmitted and notified to the manned vehicle 70-1 from the server-side communication control part 311*e*, and the maximum level of attention is called as described with reference to FIG. 15 (S2303) in accordance with the distance from the current position of the manned vehicle 70-1 to the interfering spot 82 where the unmanned dump truck 20-1 and the manned vehicle 70-1 could interfere with each other. In addition, the interference control part 311*c* may generate braking instruction information to perform the interference avoidance action, as necessary, in accordance with the distance, and transmit the braking instruction information to the dump truck terminal device 26 of the unmanned dump truck 20-1.

Meanwhile, in a case where the stop trigger region and the traveling available region do not overlap with each other (S2003/No), the interference control part 311*c* determines whether there is request information on an update of the travel-permitted section from the unmanned dump truck 20-1 (S2005).

In a case where there is the request information on an update of the travel-permitted section from the unmanned dump truck 20-1 (S2005/Yes), it is determined whether the stop trigger region and the next travel-permitted section candidate to be subsequently set for the unmanned dump truck 20-1 overlap with each other (S2006).

In a case where the stop trigger region and the next travel-permitted section candidate of the unmanned dump truck 20-1 overlap with each other (S2006/Yes), similarly to the first embodiment, such a case means that the manned vehicle 70-1 is present in the next travel-permitted section to be subsequently set for the unmanned dump truck 20-1 as shown in FIGS. 16A and 16B. In this case, the interference control part 311*c* does not set, for the unmanned dump truck 20-1, the next travel-permitted section candidate that overlaps with the stop trigger region (S2007).

Then, the interference avoidance processing of the warning level 2 in which the manned vehicle 70-1 is interrupting the travel path of the unmanned dump truck 20-1 is performed (S2008).

Figure 24:
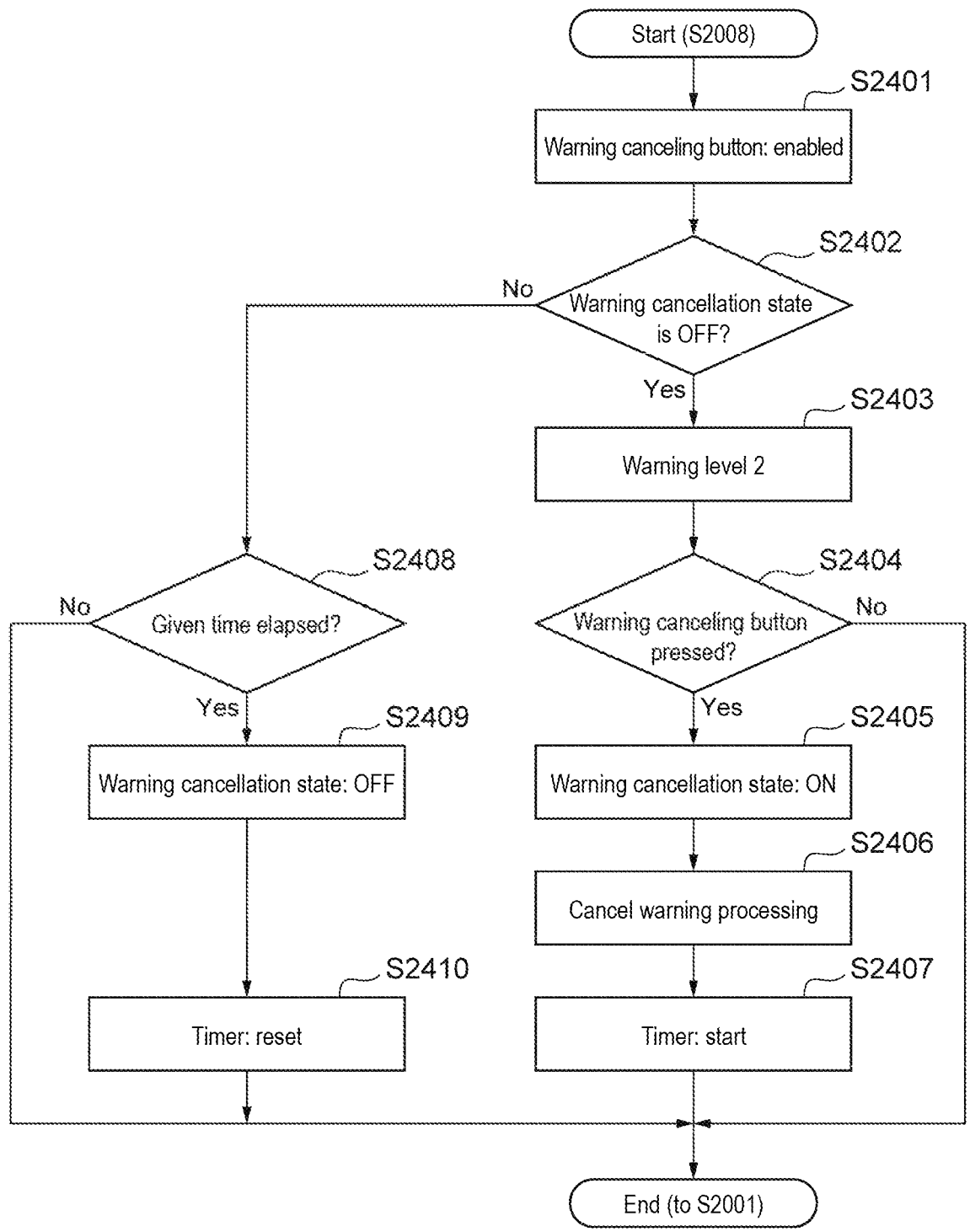
FIG. 24 is a flow chart showing a flow of the warning processing of the warning level 2 including the warning information canceling function.

FIG. 24 is a flow chart showing a flow of the warning processing of the warning level 2 (S2008) including the warning information canceling function. The interference control part 311*c* enables the warning canceling button for canceling the warning information (S2401), so as to enable the cancellation of the warning information.

Next, it is determined whether the warning cancellation state is OFF (S2402), and in a case where the warning cancellation state is OFF (S2402/Yes), similarly to the first embodiment, the warning information (warning information corresponding to the warning level 2) indicating that the manned vehicle 70-1 is interrupting the advancement of the unmanned dump truck 20-1 is generated and the warning information is transmitted and notified to the manned vehicle 70-1 from the server-side communication control part 311*e* (S2403).

Then, the interference control part 311*c* determines whether the warning canceling button was pressed (S2404). When the warning canceling button was pressed (S2404/Yes), the warning cancellation state is set to be ON (S2405), and the aforementioned warning processing such as making a warning sound and displaying a warning is cancelled (S2406). Further, to measure the time elapsed from the start of the warning cancellation state, a timer is started (S2407). This timer is used to determine whether the manned vehicle 70-1 interrupting the advancement of the unmanned dump truck 20-1 is still interrupting the advancement of the unmanned dump truck 20-1 even after a given time has elapsed despite the cancellation of the warning. On the other hand, when the warning canceling button is not pressed (S2404/No), the process returns to step S2001.

Further, in the determination in S2402, in a case where the warning cancellation state is ON (S2402/No), it is determined whether a given time has elapsed from the start of the timer (S2408). In a case where the given time has elapsed (S2408/Yes), the warning cancellation state is set to be OFF (S2409) (that is, the state of not canceling the warning information is restored) and the timer is reset (S2410). With this processing, even after the warning is cancelled and the given time has elapsed, if the manned vehicle 70-1 is interrupting the advancement of the unmanned dump truck 20-1, the processing of the warning level 2 can be performed again.

Meanwhile, in a case where the stop trigger region and the next travel-permitted section candidate do not overlap with each other (S2006/NO), since there is request information on an update of the travel-permitted section from the unmanned dump truck 20-1 and the manned vehicle 70-1 is not present in the next travel-permitted section, the next travel-permitted section is set for the unmanned dump truck 20-1 (S2009).

In a case where the next travel-permitted section is set (S2009) or there is no request information on an update of the travel-permitted section from the unmanned dump truck 20-1 (S2005/No), it is determined whether the stop trigger region and the warning region overlap with each other (S2010).

In a case where the stop trigger region and the warning region of the unmanned dump truck 20-1 overlap with each other (S2010/Yes), similarly to the first embodiment, the interference avoidance processing of the warning level 1 in which the unmanned dump truck 20-1 is approaching the manned vehicle 70-1 and is about to pass its side is performed (S2011), as shown in FIG. 18.

Figure 25:
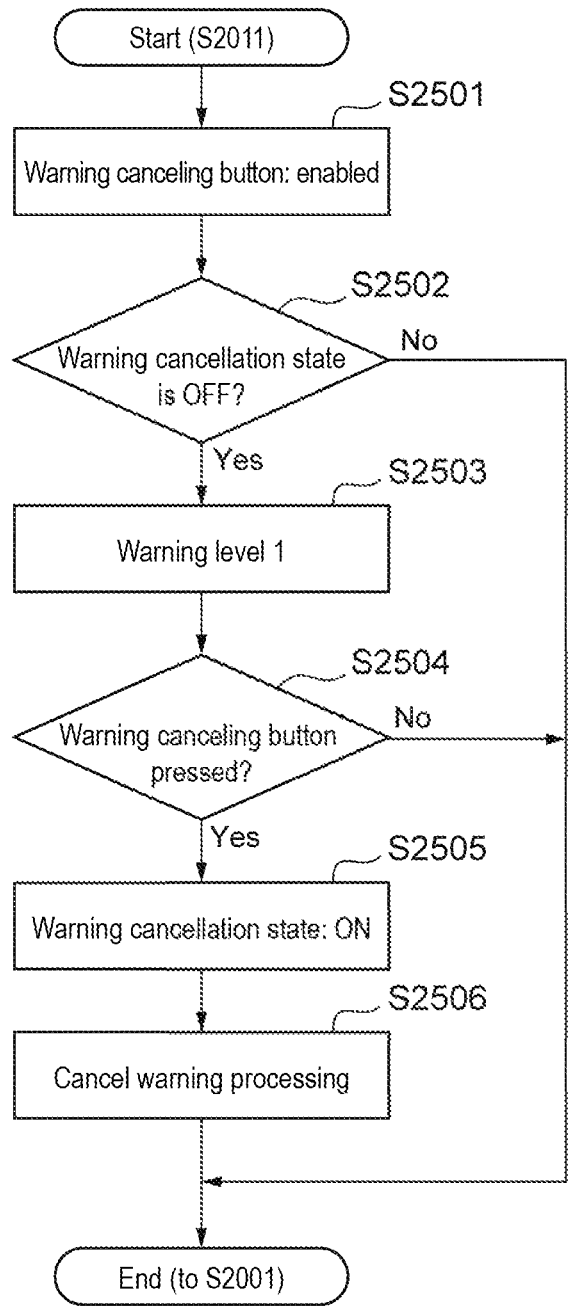
FIG. 25 is a flow chart showing a flow of the warning processing of the warning level 1 including the warning information canceling function.

FIG. 25 is a flow chart showing a flow of the warning processing of the warning level 1 (S2011) including the warning information canceling function. Similarly to the warning level 2, the interference control part 311*c* enables the warning canceling button for canceling the warning information (S2501), so as to enable the cancellation of the warning information.

Next, it is determined whether the warning cancellation state is OFF (S2502), and in a case where the warning cancellation state is OFF (S2502/Yes), the interference control part 311*c* generates the warning information (warning information corresponding to the warning level 1) indicating that the unmanned dump truck 20-1 is approaching the manned vehicle 70-1 and the warning information is transmitted and notified to the manned vehicle 70-1 from the server-side communication control part 311*e* (S2503).

Then, the interference control part 311*c* determines whether the warning canceling button was pressed (S2504). When the warning canceling button was pressed (S2504/Yes), the warning cancellation state is set to be ON (S2505), and the aforementioned warning processing such as making a warning sound and displaying a warning is cancelled (S2506). On the other hand, when the warning canceling button is not pressed (S2504/No), the process returns to S2001 while keeping the warning cancellation state OFF. In this manner, unless the warning is cancelled, the warning information is kept to be notified to the manned vehicle 70-1.

Meanwhile, in a case where the warning canceling button is pressed and the warning cancellation state is ON (S2502/No), the warning to the manned vehicle 70-1 is cancelled.

Finally, in a case where the stop trigger region and the warning region of the unmanned dump truck 20-1 do not overlap with each other (S2010/No), or after the warning information is entirely notified (S2004, S2008, S2011), the process returns to the initial processing S2001 of the interference control processing and the interference control processing is repeated.

Figure 26:
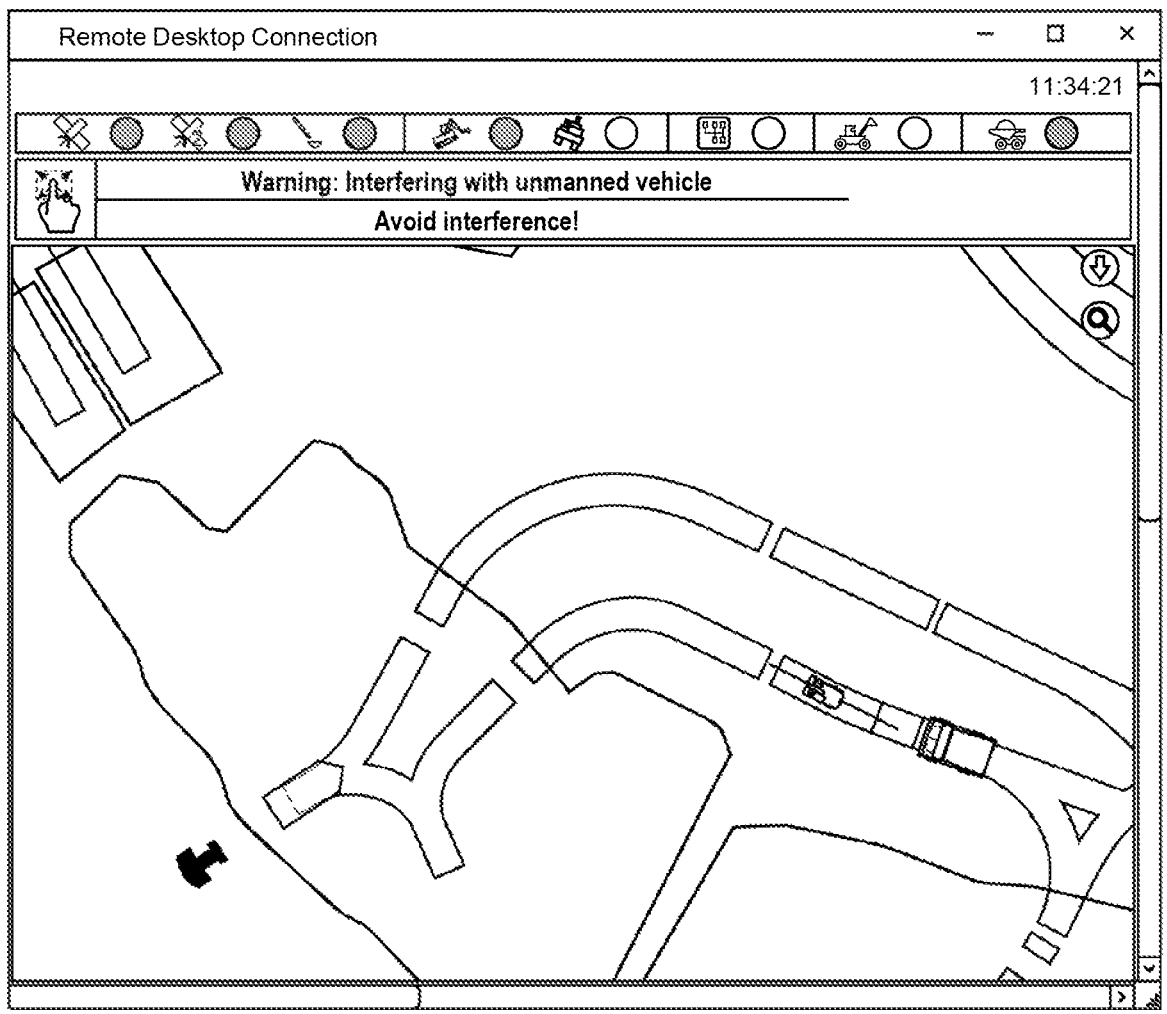
FIG. 26 shows an example of a more practical screen display.

It should be noted that FIG. 26 shows an example of a more practical screen display that is shown in the terminal-side display device 763 by the warning processing part 761a of the manned vehicle terminal device 76 in response to the warning information of the aforementioned warning level.

As described above, in the present embodiment, the traffic control server 31 includes the warning canceling function for canceling the warning information, and in a case where an overlap exists between the stop trigger region of the manned vehicle 70-1 and the next travel-permitted section to be subsequently set for the unmanned vehicle 20-1 or the warning region, the warning information can be cancelled, and in a case where an overlap exists between the stop trigger region of the manned vehicle 70-1 and the travel-permitted section set for the unmanned vehicle 20-1, the warning information cannot be cancelled.

In addition, in a case where an overlap exists between the stop trigger region of the manned vehicle 70-1 and the next travel-permitted section to be subsequently set for the unmanned vehicle 20-1, the traffic control server 31 measures the time elapsed from the time of cancellation of the warning information, and restores the state of not canceling the warning information when the measured time reaches a given time.

Further, the display device 763 provided in the manned vehicle 70-1 includes the warning canceling button for canceling the warning information on the display screen.

In this manner, with the function of canceling the warning information in the warning level 1 and the warning level 2 that do not require emergency avoidance of interference with the unmanned dump truck 20-1, the driver of the manned vehicle 70-1 can concentrate on the operation.

It should be noted that the present invention is not limited to the aforementioned embodiments, and includes various modifications. For example, although the aforementioned embodiments have been described in detail to clearly illustrate the present invention, the present invention does not necessarily include all the structures described. It is possible to replace a part of a structure of an embodiment with a structure of another embodiment. In addition, it is also possible to add, to a structure of an embodiment, a structure of another embodiment. Further, it is also possible to, for a part of a structure of each embodiment, add, remove, or substitute a structure of another embodiment.

Some or all of the aforementioned structures, functions, processing units, processing means, and the like may be implemented as hardware by designing with an integrated circuit, for example. Alternatively, each of the aforementioned structures, functions, and the like may be implemented by software such that a processor analyzes and executes a program that implements each function. Information such as the program that implements each function, tables, and files can be stored in a storage device such as memory, a hard disk, or an SSD (Solid State Drive); or a storage medium such as an IC card, an SD card, or a DVD.

In addition, the control lines and information lines represent those that are considered to be necessary for description, and do not necessarily represent all the control lines and information lines that are necessary for a product. In practice, almost all the structures may be considered to be mutually connected.

REFERENCE SIGNS LIST

1 Traffic control system
10-1, 10-2 Excavator
20-1, 20-2 Unmanned dump truck (unmanned vehicle)
26 Dump truck terminal device
30 Control center
31 Traffic control server
32 Antenna
40 Wireless communication network
41-1, 41-2, 41-3 Wireless base station
50-1, 50-2, 50-3 Positioning satellite
60 Haul path
61 Excavation site
62, 63 Dumping site
70-1, 70-2 Manned vehicle
76 Manned vehicle terminal device
763 Terminal-side display device
768 Warning device

The invention claimed is:

1. A traffic control server performing traffic control for interference avoidance of an unmanned vehicle autonomously traveling along a predetermined travel path in a mine and a manned vehicle with a driver on board traveling in the mine, the traffic control server wirelessly communicating with and connected to each of the unmanned vehicle and the manned vehicle, the traffic control server comprising:
   a travel-permitted section setting part adapted to set a partial section on the travel path for the unmanned vehicle as a travel-permitted section where the unmanned vehicle is permitted to travel;
   an interference control part adapted to issue a warning to the manned vehicle to avoid interference between the manned vehicle and the unmanned vehicle traveling in the travel-permitted section, when the manned vehicle approaches the travel-permitted section;
   a master map information memory adapted to store map information indicating the travel path of the unmanned vehicle;
   a server-side communication control part adapted to transmit, to the unmanned vehicle, section response information indicating the travel-permitted section set, and transmit, to the manned vehicle, warning information for issuing the warning and adapted to receive position information of the manned vehicle calculated by a position calculation device mounted in the manned vehicle and position information of the unmanned vehicle calculated by a position calculation device of the unmanned vehicle; and
   an interference determination region setting part adapted to set a stop trigger region around the manned vehicle where the manned vehicle can stop, on the basis of the position information of the manned vehicle received, and adapted to set a warning region around the travel-permitted section set for the unmanned vehicle, wherein the warning region is a region extended by a predetermined distance in a widthwise direction relative to the travel-permitted section, and the stop trigger region is a combination of a region extended by a predetermined distance in front-back and left-right directions relative to the manned vehicle and a region extended by a distance in which the manned vehicle can stop in a forward direction of the manned vehicle, wherein:
the interference control part generates the warning information for performing at least one of displaying a warning screen or making a warning sound to the manned vehicle in accordance with an overlap among the stop trigger region of the manned vehicle, the travel-permitted section set for the unmanned vehicle, a next travel-permitted section that is the travel-permitted section to be subsequently set for the unmanned vehicle, and the warning region set for the travel-permitted section, and
the server-side communication control part transmits the warning information to the manned vehicle.

2. The traffic control server according to claim 1, wherein the interference control part generates:
the warning information of a highest emergency level of avoidance in a case where an overlap exists between the stop trigger region of the manned vehicle and the travel-permitted section set for the unmanned vehicle;
the warning information of a moderate emergency level of avoidance in a case where an overlap exists between the stop trigger region of the manned vehicle and the next travel-permitted section to be subsequently set for the unmanned vehicle; and
the warning information of a lowest emergency level of avoidance in a case where an overlap exists between the stop trigger region of the manned vehicle and the warning region.

3. The traffic control server according to claim 1, wherein:
the interference control part generates the warning information and generates braking instruction information to cause the unmanned vehicle to perform a braking operation, and the server-side communication control part transmits the warning information to the manned vehicle and transmits the braking instruction information to the unmanned vehicle.

4. The traffic control server according to claim 1, comprising a warning canceling function for canceling the warning information, wherein:
in a case where an overlap exists between the stop trigger region of the manned vehicle and the next travel-permitted section to be subsequently set for the unmanned vehicle or the warning region, the warning information can be cancelled, and
in a case where an overlap exists between the stop trigger region of the manned vehicle and the travel-permitted section set for the unmanned vehicle, the warning information cannot be cancelled.

5. The traffic control server according to claim 4, wherein
in a case where an overlap exists between the stop trigger region of the manned vehicle and the next travel-permitted section to be subsequently set for the unmanned vehicle, a time elapsed from a time of cancellation of the warning information is measured, and when the time measured reaches a given time, a state of not canceling the warning information is restored.

6. A traffic control system including a traffic control server performing traffic control for interference avoidance of an unmanned vehicle autonomously traveling along a predetermined travel path in a mine and a manned vehicle with a driver on board traveling in the mine, the traffic control server wirelessly communicating with and connected to each of the unmanned vehicle and the manned vehicle, the traffic control server comprising:

a travel-permitted section setting part adapted to set a partial section on the travel path for the unmanned vehicle as a travel-permitted section where the unmanned vehicle is permitted to travel;
an interference control part adapted to issue a warning to the manned vehicle to avoid interference between the manned vehicle and the unmanned vehicle traveling in the travel-permitted section, when the manned vehicle approaches the travel-permitted section;
a master map information memory adapted to store map information indicating the travel path of the unmanned vehicle;
a server-side communication control part adapted to transmit, to the unmanned vehicle, section response information indicating the travel-permitted section set, and transmit, to the manned vehicle, warning information for issuing the warning and adapted to receive position information of the manned vehicle calculated by a position calculation device mounted in the manned vehicle and position information of the unmanned vehicle calculated by a position calculation device of the unmanned vehicle; and
an interference determination region setting part adapted to set a stop trigger region around the manned vehicle where the manned vehicle can stop, on the basis of the position information of the manned vehicle received, and adapted to set a warning region around the travel-permitted section set for the unmanned vehicle, wherein the warning region is a region extended by a predetermined distance in a widthwise direction relative to the travel-permitted section, and the stop trigger region is a combination of a region extended by a predetermined distance in front-back and left-right directions relative to the manned vehicle and a region extended by a distance in which the manned vehicle can stop in a forward direction of the manned vehicle,
wherein:
the manned vehicle includes:
a manned terminal-side communication control part adapted to receive the warning information and to transmit, to the traffic control server, the position information of the manned vehicle calculated by the position calculation device mounted in the manned vehicle; and
a warning processing part adapted to perform processing of issuing the warning to the driver on the basis of the warning information,
the unmanned vehicle includes:
an unmanned terminal-side communication control part adapted to receive the section response information and to transmit, to the traffic control server, the position information of the unmanned vehicle calculated by the position calculation device mounted in the unmanned vehicle; and
an autonomous travel control part adapted to control the unmanned vehicle to autonomously travel on the basis of the section response information,
the interference control part generates the warning information for performing at least one of displaying a warning screen or making a warning sound to the manned vehicle in accordance with an overlap among the stop trigger region of the manned vehicle, the travel-permitted section set for the unmanned vehicle, a next travel-permitted section that is the travel-permitted section to be subsequently set for the unmanned vehicle, and the warning region set for the travel-permitted section, and the server-side communication control part transmits the warning information to the manned vehicle.

7. The traffic control system according to claim 6, comprising a display device adapted to display the warning information, wherein a screen display of the display device is changed on the basis of the warning information generated in accordance with an overlap among the stop trigger region of the manned vehicle, the travel-permitted section set for the unmanned vehicle, the next travel-permitted section that is the travel-permitted section to be subsequently set for the unmanned vehicle, and the warning region set for the travel-permitted section.

8. A display device wirelessly communicating with and connected to the traffic control server according to claim 1, the display device adapted to display the warning information, wherein a screen display of the display device is changed on the basis of the warning information generated in accordance with an overlap among the stop trigger region of the manned vehicle, the travel-permitted section set for the unmanned vehicle, the next travel-permitted section that is the travel-permitted section to be subsequently set for the unmanned vehicle, and the warning region set for the travel-permitted section.

\* \* \* \* \*